United States Patent
Morikawa et al.

(10) Patent No.: US 8,925,921 B2
(45) Date of Patent: Jan. 6, 2015

(54) PAPER CONVEYING APPARATUS, ABNORMALITY DETECTION METHOD, AND COMPUTER-READABLE, NON-TRANSITORY MEDIUM

(71) Applicant: PFU Limited, Kahoku-shi, Ishikawa (JP)

(72) Inventors: Shuichi Morikawa, Kahoku (JP); Masanobu Hongo, Kahoku (JP); Ryoichi Yasukawa, Kahoku (JP); Takayuki Umi, Kahoku (JP)

(73) Assignee: PFU Limited, Kahoku-shi (JP)

( * ) Notice: Subject to any disclaimer, the term of this patent is extended or adjusted under 35 U.S.C. 154(b) by 0 days.

(21) Appl. No.: 13/963,884

(22) Filed: Aug. 9, 2013

(65) Prior Publication Data

US 2014/0077445 A1 Mar. 20, 2014

(30) Foreign Application Priority Data

Sep. 14, 2012 (JP) ................................. 2012-203446

(51) Int. Cl.
*B65H 7/02* (2006.01)
*G03G 15/00* (2006.01)
*B65H 7/06* (2006.01)
*H04N 1/00* (2006.01)
*H04N 1/32* (2006.01)
*H04N 1/193* (2006.01)
*H04N 1/203* (2006.01)

(52) U.S. Cl.
CPC .............. *B65H 7/06* (2013.01); *H04N 1/00689* (2013.01); *H04N 1/00716* (2013.01); *H04N 1/00729* (2013.01); *H04N 1/00732* (2013.01); *H04N 1/00742* (2013.01); *H04N 1/00745* (2013.01); *H04N 1/00771* (2013.01); *H04N 1/3263* (2013.01); *H04N 1/193* (2013.01); *H04N 1/2034* (2013.01); *H04N 2201/0081* (2013.01); *B65H 2511/524* (2013.01); *B65H 2511/528* (2013.01); *B65H 2553/30* (2013.01)
USPC .................... 271/258.04; 271/258.01; 399/21

(58) Field of Classification Search
USPC .................... 399/21; 271/258.01, 259, 258.04
See application file for complete search history.

(56) References Cited

U.S. PATENT DOCUMENTS 6,741,727 B1   5/2004   Hirasawa
7,845,637 B2 * 12/2010   Shimazaki .................... 271/262
(Continued)

FOREIGN PATENT DOCUMENTS

JP    56159656 A  * 12/1981  ............. G03G 15/00
JP    57-169767       10/1982
(Continued)

OTHER PUBLICATIONS

Office action mailed Jan. 7, 2014 in JP 2012-185247 including English translation, 4pp.

(Continued)

*Primary Examiner* — Patrick Cicchino
(74) *Attorney, Agent, or Firm* — Christie, Parker & Hale, LLP

(57) ABSTRACT

There are provided a paper conveying apparatus, an abnormality detection method and a computer-readable, non-transitory medium which can precisely determine whether an abnormality has occurred when paper is conveyed. The paper conveying apparatus includes a sound generator for generating a paper sound by contacting a paper, a first sound signal generator for generating a first sound signal corresponding to the paper sound, and an abnormal conveyance detector for determining whether an abnormal conveyance has occurred when the paper is being conveyed according to a detection method, wherein the abnormal conveyance detector is configured to change the detection method based on the first sound signal.

4 Claims, 23 Drawing Sheets

(56) References Cited

U.S. PATENT DOCUMENTS

| | | | |
|---|---|---|---|
| 8,066,280 B2* | 11/2011 | Simonis et al. | 271/262 |
| 8,091,888 B2* | 1/2012 | Tamamoto | 271/264 |
| 8,266,965 B2* | 9/2012 | Schoen | 73/598 |
| 8,419,014 B2* | 4/2013 | Yamagishi et al. | 271/262 |
| 8,567,777 B2* | 10/2013 | Syracuse et al. | 271/263 |
| 2002/0079644 A1* | 6/2002 | Phinney | 271/258.01 |
| 2005/0127597 A1* | 6/2005 | Sano et al. | 271/258.01 |
| 2006/0145412 A1* | 7/2006 | Tagawa et al. | 271/258.01 |
| 2008/0224390 A1* | 9/2008 | Ma et al. | 271/258.01 |
| 2011/0278786 A1* | 11/2011 | Yamagishi et al. | 271/18 |
| 2011/0292459 A1 | 12/2011 | Murosaki | |
| 2012/0019841 A1* | 1/2012 | Schaertel et al. | 358/1.9 |
| 2012/0235929 A1* | 9/2012 | Hongo et al. | 345/173 |
| 2013/0093136 A1* | 4/2013 | Sakharshete et al. | 271/258.01 |
| 2013/0140757 A1* | 6/2013 | Phinney et al. | 271/10.01 |
| 2013/0140760 A1* | 6/2013 | Syracuse et al. | 271/18 |
| 2013/0300056 A1* | 11/2013 | Kai | 271/262 |

FOREIGN PATENT DOCUMENTS

| | | |
|---|---|---|
| JP | 62-117364 | 5/1987 |
| JP | 3-192050 | 8/1991 |
| JP | 04-264462 | 9/1992 |
| JP | 5-24716 | 2/1993 |
| JP | 06-103438 | 4/1994 |
| JP | 2000-182052 | 6/2000 |
| JP | 2000-251108 | 9/2000 |
| JP | 2001-302021 | 10/2001 |
| JP | 2003-212386 | 7/2003 |
| JP | 2006-84595 | 3/2006 |
| JP | 2006-298606 | 11/2006 |
| JP | 2009-161291 | 7/2009 |
| JP | 2010-166442 | 7/2010 |
| JP | 2011-31999 | 2/2011 |
| JP | 2011-37524 | 2/2011 |
| JP | 2011-244091 | 12/2011 |
| JP | 2011-254248 | 12/2011 |
| JP | 2012-131579 | 7/2012 |

OTHER PUBLICATIONS

Office action mailed Jul. 9, 2013 in JP 2012-185165 including English translation, 6pp.

Office action mailed Jul. 9, 2013 in JP 2012-185247 including English translation, 6pp.

Office action mailed Sep. 24, 2013 in JP 2012-185247 including English translation, 5pp.

Office action mailed Jul. 9, 2013 in JP 2012-185335 including English translation, 6pp.

Office action mailed Jul. 9, 2013 in JP 2012-185404 including English translation, 5pp.

Office action mailed Jul. 9, 2013 in JP 2012-203446 including English translation, 6pp.

* cited by examiner

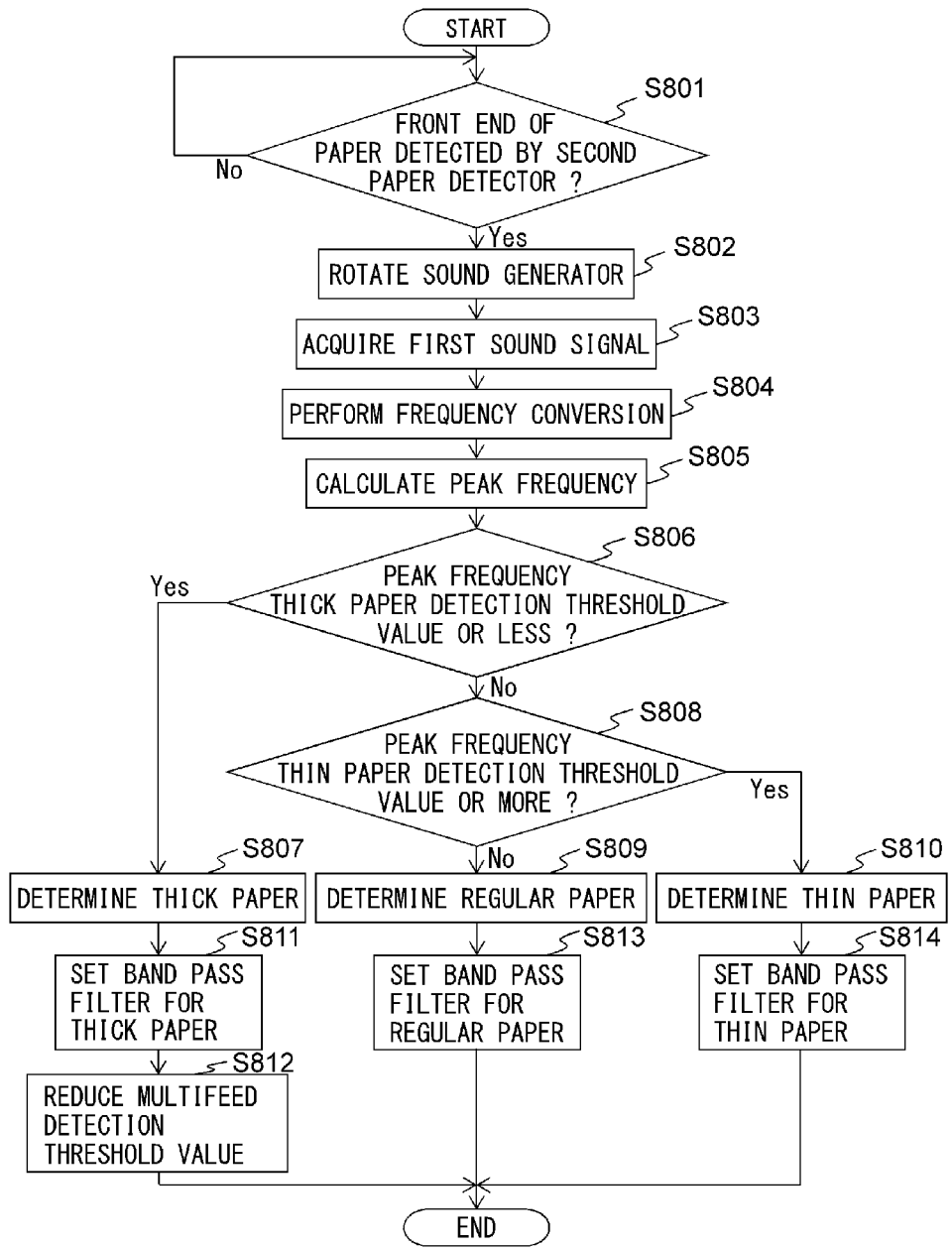

PAPER CONVEYING APPARATUS, ABNORMALITY DETECTION METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2012-203446, filed on Sep. 14, 2012, the entire contents of which are incorporated herein by reference.

TECHNICAL FIELD

Embodiments discussed in the present specification relate to paper conveying technology.

BACKGROUND

In an image reading apparatus, image copying apparatus, or other paper conveying apparatus, sometimes a jam occurs when paper is conveyed along a conveyance path, multifeed occurs where a plurality of sheets of paper are conveyed along the conveyance path in a superposed state, and other abnormalities may occur when paper is conveyed. In general, a paper conveying apparatus is provided with the function of stopping the operation of the apparatus when a jam or multifeed has occurred.

A jam detection device of a copier which converts a sound which is generated on the conveyance path to an electrical signal and determines that a jam has occurred when the time where the reference level is exceeded exceeds a reference value has been disclosed (see Japanese Laid-Open Patent Publication No. 57-169767).

Further, an ink jet recording apparatus which has a striking means which strikes a recording medium on a conveyance route so as to make it generate a sound and a sound detector which detects the sound which is generated by the striking means is disclosed. This ink jet recording apparatus discriminates the type of recording medium from an electrical signal from the sound detector and sets a recording method or recording pattern in accordance with the recording characteristics of the type of recording medium which is discriminated (see Japanese Laid-Open Patent Publication No. 2003-212386).

Further, a currency or negotiable security or other discriminating apparatus which has a sound generating means for generating a sound during conveyance of currency or a negotiable security etc., and a sound detecting means for detecting the sound which is generated by the sound generating means and which discriminates the genuineness of the currency or negotiable security etc., from the sound which is detected by the sound detecting means is disclosed (see Japanese Laid-Open Patent Publication No. 2000-251108).

SUMMARY

In a paper conveying apparatus, depending on the type of the conveyed paper, sometimes it is difficult to discriminate if an abnormality has occurred when the paper is conveyed and sometimes it is erroneously determined that an abnormality has occurred despite no abnormality having occurred.

Accordingly, it is an object of the present invention is to provide a paper conveying apparatus and an abnormality detection method which can precisely determine whether an abnormality has occurred when paper is conveyed, and a computer-readable, non-transitory medium storing a computer program for causing a computer to implement such an abnormality detection method.

According to an aspect of the apparatus, there is provided a paper conveying apparatus. The paper conveying apparatus includes a sound generator for generating a paper sound by contacting a paper, a first sound signal generator for generating a first sound signal corresponding to the paper sound, and an abnormal conveyance detector for determining whether an abnormal conveyance has occurred when the paper is being conveyed according to a detection method, wherein the abnormal conveyance detector is configured to change the detection method based on the first sound signal.

According to an aspect of the method, there is provide an abnormality detection method. The abnormality detection method includes making a sound generator for generating a paper sound by contacting a paper, generate the paper sound, acquiring a first sound signal corresponding to the paper sound, and determining, by a computer, whether an abnormal conveyance has occurred when the paper is being conveyed according to a detection method, changing by the computer the detection method based on the first sound signal, in the determining step.

According to an aspect of the computer-readable, non-transitory medium storing a computer program, the computer program causes a computer to execute a process, including making a sound generator for generating a paper sound by contacting a paper, generate the paper sound, acquiring a first sound signal corresponding to the paper sound, and determining whether an abnormal conveyance has occurred when the paper is being conveyed according to a detection method, changing by the computer the detection method based on the first sound signal, in the determining step.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 17 is a flow chart which shows still another example of an operation of paper thickness detection processing.

DESCRIPTION OF EMBODIMENTS

Hereinafter, a paper conveying apparatus, an abnormality detection method, and computer program according to an embodiment, will be described with reference to the drawings. However, note that the technical scope of the invention is not limited to these embodiments and extends to the inventions described in the claims and their equivalents.

Figure 1:
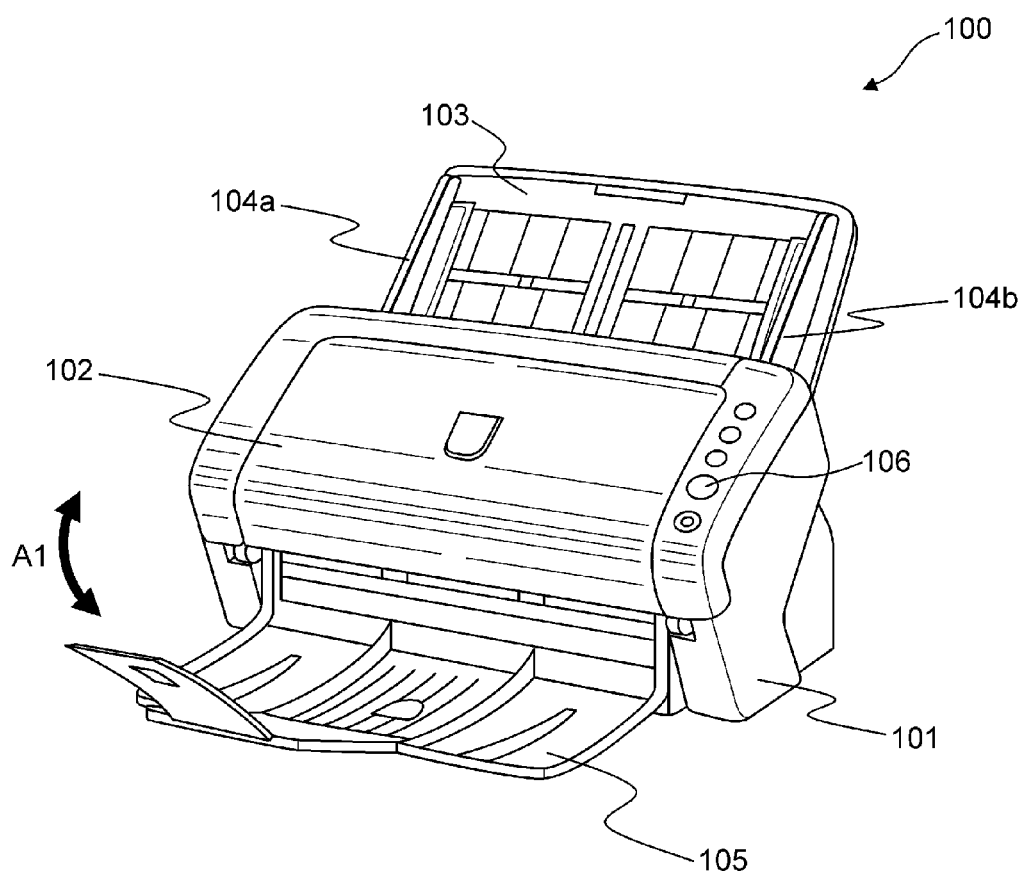
FIG. 1 is a perspective view which shows a paper conveying apparatus 100 according to an embodiment.

FIG. 1 is a perspective view which shows a paper conveying apparatus 100 which is configured as an image scanner, according to an embodiment.

The paper conveying apparatus 100 includes a lower housing 101, an upper housing 102, a paper tray 103, an ejection tray 105, an operation button 106, etc.

The upper housing 102 is arranged at a position which covers the top surface of the paper conveying apparatus 100 and is engaged with the lower housing 101 by hinges so as to be able to be opened and closed at the time of a paper jam, at the time of cleaning of the inside of the paper conveying apparatus 100, etc.

The paper tray 103 is engaged with the lower housing 101 in a manner enabling a paper to be placed. The paper tray 103 is provided with side guides 104a and 104b which can be moved in a direction perpendicular to a conveyance direction of the paper, that is, to the left and right directions from the conveyance direction of the paper. By positioning the side guides 104a and 104b to match with the width of the paper, it is possible to limit the width direction of the paper.

The ejection tray 105 is engaged with the lower housing 101 by hinges so as to be able to pivot in the direction which is shown by an arrow mark A1. In the opened state as shown in FIG. 1, the ejected paper can be held.

The operation button 106 is arranged on the surface of the upper housing 102. If pushed, it generates and outputs an operation detection signal.

Figure 2:
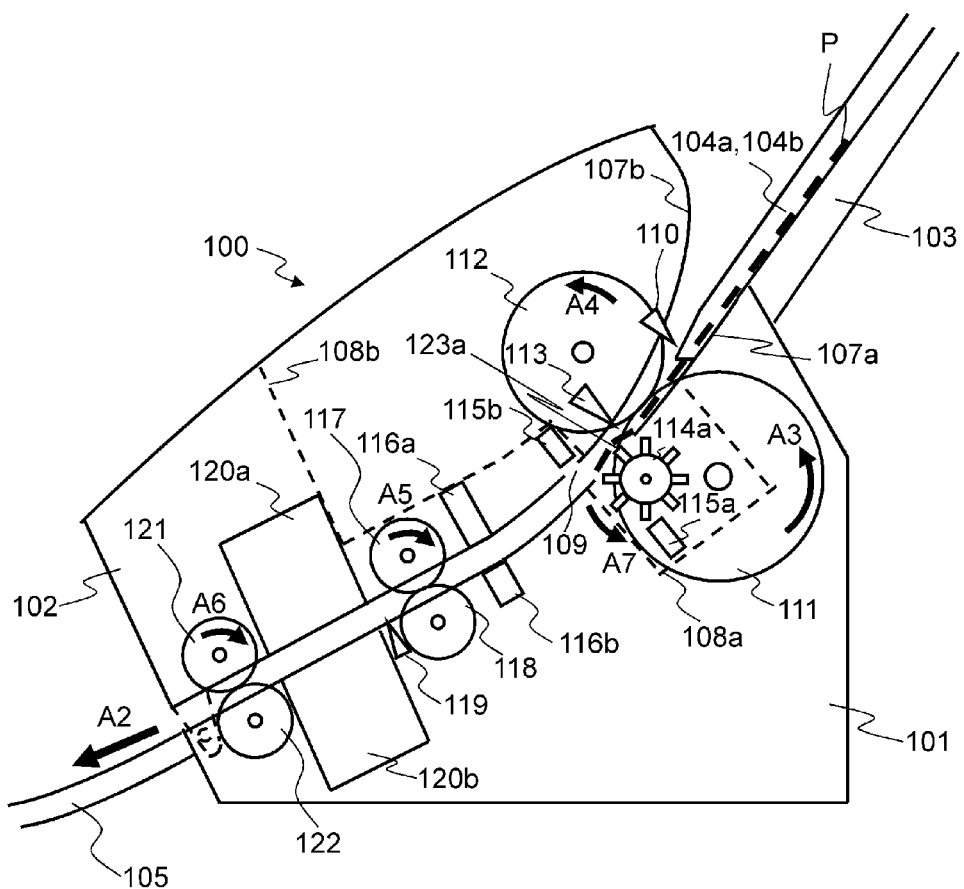
FIG. 2 is a view for explaining an example of a conveyance route at an inside of a paper conveying apparatus 100.

FIG. 2 is a view for explaining an example of the conveyance route at the inside of the paper conveying apparatus 100.

The conveyance route at the inside of the paper conveying apparatus 100 has a first paper detector 110, paper feed rollers 111, retard rollers 112, a second paper detector 113, a sound generator 114a, a first microphone 115a, a second microphone 115b, an ultrasonic transmitter 116a, an ultrasonic receiver 116b, a first conveyor rollers 117, a first driven rollers 118, a third paper detector 119, a first image capture unit 120a, a second image capture unit 120b, second conveyor rollers 121, second driven rollers 122, etc.

The top surface of the lower housing 101 forms the lower guide 107a of the conveyance path of the paper, while the bottom surface of the upper housing 102 forms the upper guide 107b of the conveyance path of the paper. In FIG. 2, the arrow mark A2 shows the conveyance direction of the paper. Below, "upstream" means upstream of the conveyance direction A2 of the paper, while "downstream" means downstream of the conveyance direction A2 of the paper.

The first paper detector 110 has a contact detection sensor which is arranged at an upstream side of the paper feed roller 111 and the retard roller 112 and detects if a paper is placed on the paper tray 103. The first paper detector 110 generates and outputs a first paper detection signal which changes in signal value between a state in which a paper is placed on the paper tray 103 and a state in which one is not placed.

The second paper detector 113 has a contact detection sensor which is arranged at a downstream side of the paper feed roller 111 and the retard roller 112 and at an upstream side of the first conveyor roller 117 and first driven roller 118 and detects if there is a paper present at that position. The second paper detector 113 generates and outputs a second paper detection signal which changes in signal value between a state at which there is a paper at that position and a state where there is no paper there.

The sound generator 114a is a member for contacting the paper P which is conveyed on the conveyance path and for generating a paper sound from the paper P. The sound generator 114a is supported rotatably at a main body of the paper conveying apparatus 100 and is rotated by a not shown drive transmitting means (gear, sprocket, etc.) in the direction of the arrow mark A7. At the outer circumferential surface of the sound generator 114a, projecting parts 123a which contact the paper P are provided.

The first microphone 115a is an example of sound detector, is provided near the sound generator 114a, detects the paper sound generated by the sound generator 114a, and generates and outputs an analog signal corresponding to the detected sound. The first microphone 115a is arranged at the downstream side of the paper feed rollers 111 and the retard rollers 112 while fastened to the frame 108a inside of the lower housing 101.

The second microphone 115b is an example of sound detector, is provided near the paper conveyance path, detects the sound generated by the paper during conveyance of the paper, and generates and outputs an analog signal corresponding to the detected sound. The second microphone 115b is arranged at the downstream side of the paper feed rollers 111 and the retard rollers 112 while fastened to the frame 108b inside of the upper housing 102. To enable the sound generated by the paper during conveyance of the paper to be more precisely detected by the second microphone 115b, a hole 109 is provided at the upper guide 107b at a position which faces the second microphone 115b.

The ultrasonic transmitter 116a and the ultrasonic receiver 116b are an example of an ultrasonic detector, and are arranged near the conveyance path of the paper so as to face each other across the conveyance path. The ultrasonic transmitter 116a transmits an ultrasonic wave. On the other hand, the ultrasonic receiver 116b detects an ultrasonic wave which is transmitted by the ultrasonic transmitter 116a and passes through the paper or papers, and generates and outputs an ultrasonic signal an ultrasonic signal comprised of an electrical signal corresponding to the detected ultrasonic wave. Below, the ultrasonic transmitter 116a and the ultrasonic receiver 116b will sometimes be referred to altogether as the "ultrasonic sensor 116".

The third paper detector 119 has a contact detection sensor which is arranged at a downstream side of the first conveyor roller 117 and the first driven roller 118 and an upstream side of the first image capture unit 120a and the second image capture unit 120b and detects if there is a paper at that position. The third paper detector 119 generates and outputs a third paper detection signal which changes in signal value between a state where there is a paper at that position and a state where there is no such paper there.

The first image capture unit 120a has a CIS (contact image sensor) of an equal magnification optical system type which is provided with an image capture element using CMOS's (complementary metal oxide semiconductors) which are arranged in a line in the main scan direction. This CIS reads the back surface of the paper and generates and outputs an analog image signal. Similarly, the second image capture unit 120b has a CIS of an equal magnification optical system type which is provided with an image capture element using CMOS's which are arranged in a line in the main scan direction. This CIS reads the front surface of the paper and generates and outputs an analog image signal. Note that, it is also possible to arrange only one of the first image capture unit 120a and the second image capture unit 120b and read only one surface of the paper. Further, instead of a CIS, it is also possible to utilize an image capturing sensor of a reduced magnification optical system type using CCD's (charge coupled devices). Below, the first image capture unit 120a and the second image capture unit 120b will sometimes be referred to overall as the "image capture units 120".

A paper which is placed on the paper tray 103 is conveyed between the lower guide 107a and the upper guide 107b toward the paper conveyance direction A2 by rotation of the paper feed roller 111 in the direction of the arrow mark A3 of FIG. 2. The retard roller 112 rotates in the direction of the arrow mark A4 of FIG. 2 at the time of paper conveyance. Due to the action of the paper feed roller 111 and the retard roller 112, when the paper tray 103 has a plurality of papers placed on it, among the papers which are placed on the paper tray 103, only the paper which is in contact with the paper feed roller 111 is separated. The conveyance of papers other than the separated paper is restricted (prevention of multifeed). The paper feed roller 111 and the retard roller 112 function as a paper separator.

A paper is fed between the first conveyor roller 117 and the first driven roller 118 while being guided by the lower guide 107a and the upper guide 107b. The paper is sent between the first image capture unit 120a and the second image capture unit 120b by the first conveyor roller 117 rotating in the direction of the arrow mark A5 of FIG. 2. The paper which is read by the image capture unit 120 is ejected onto the ejection tray 105 by the second conveyor roller 121 rotating in the direction of the arrow mark A6 of the FIG. 2.

Figure 3:
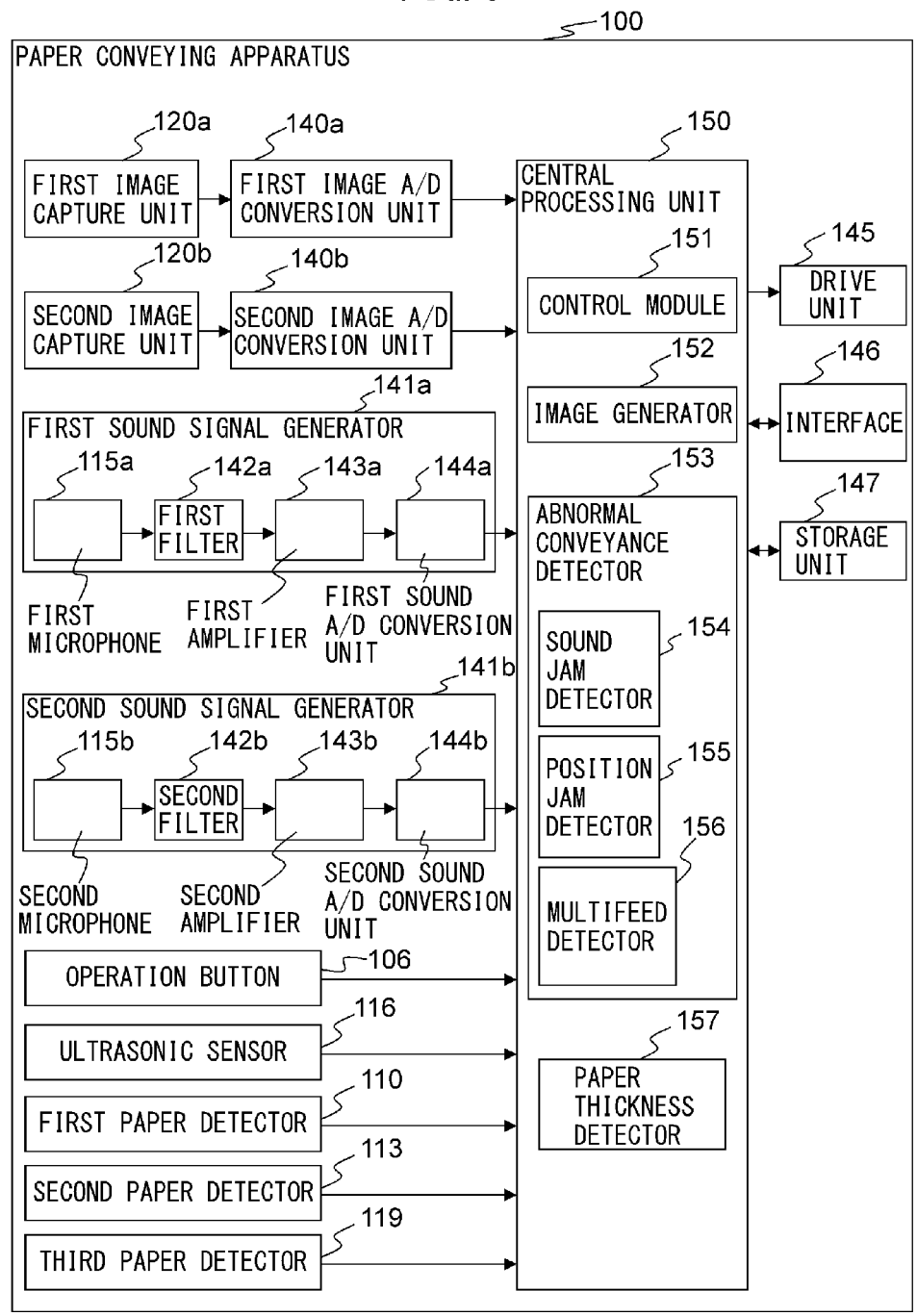
FIG. 3 is an example of a block diagram which shows a schematic configuration of a paper conveying apparatus 100.

FIG. 3 is an example of a block diagram which shows the general configuration of a paper conveying apparatus 100.

The paper conveying apparatus 100, in addition to the above-mentioned configuration, further has a first image A/D conversion unit 140a, a second image A/D conversion unit 140b, a first sound signal generator 141a, a second sound signal generator 141b, a drive unit 145, an interface 146, a storage unit 147, a central processing unit 150, etc.

The first image A/D conversion unit 140a converts an analog image signal which is output from the first image capture unit 120a from an analog to digital format to generate digital image data which it then outputs to the central processing unit 150. Similarly, the second image A/D conversion unit 140b converts the analog image signal which is output from the second image capture unit 120b from an analog to digital format to generate digital image data which it then outputs to the central processing unit 150. Below, these digital image data will be referred to as the "read image".

A first sound signal generator 141a includes the first microphone 115a, a first filter 142a, a first amplifier 143a, a first sound A/D conversion unit 144a, etc., and generates a first sound signal corresponding to the paper sound generated by the sound generator 114a. The first filter 142a filters the analog signal which is output from the first microphone 115a by a bandpass filter which passes a predetermined frequency band of the signal and outputs it to the first amplifier 143a. The first amplifier 143a amplifies the signal which is output from the first filter 142a and outputs it to the first sound A/D conversion unit 144a. The first sound A/D conversion unit 144a converts the analog signal which is output from the first amplifier 143a to a digital signal and outputs it to the central processing unit 150. Below, the signal which the first sound signal generator 141a outputs will be called the "first sound signal".

Note that, the first sound signal generator 141a is not limited to this. The first sound signal generator 141a may also include just the first microphone 115a, while the first filter 142a, the first amplifier 143a, and the first sound A/D conversion unit 144a may be provided at the outside of the first sound signal generator 141a. Further, the first sound signal generator 141a may also include just the first microphone 115a and first filter 142a or just the first microphone 113a, first filter 142a, and first amplifier 143a.

A second sound signal generator 141b includes a second microphone 115b, a second filter 142b, a second amplifier 143b, a second sound A/D conversion unit 144b, etc., and generates a sound signal corresponding to a sound generated by the paper during conveyance of the paper. The second filter 142b is provided with a plurality of bandpass filters which pass signals of different frequency bands determined in advance. The second filter 142b filters the analog signal which is output from the second microphone 115b by a bandpass filter which is set by the central processing unit 150 and outputs it to the second amplifier 143b. Note that, the second filter 142b may also be configured to be provided with just one bandpass filter and to have the frequency band which the bandpass filter passes be set by the central processing unit 150.

The second amplifier 143b amplifies the signal which is output from the second filter 142b and outputs it to the second sound A/D conversion unit 144b. The second sound A/D conversion unit 144b converts the analog signal which is output from the second amplifier 143b to a digital signal and outputs it to the central processing unit 150. Below, the signal which the second sound signal generator 141b outputs is called the "second sound signal".

Note that, the second sound signal generator 141b is not limited to this. The second sound signal generator 141b may include only the second microphone 115b, while the second filter 142b, the second amplifier 143b, and the second sound A/D conversion unit 144b may be provided at the outside of the second sound signal generator 141b. Further, the second sound signal generator 141b may also include only the second microphone 115b and the second filter 142b or only the second microphone 115b, the second filter 142b, and the second amplifier 143b.

The drive unit 145 includes one or more motors. Based on the control signals from the central processing unit 150, it rotates the paper feed rollers 111, the retard rollers 112, the first conveyor rollers 117, and the second conveyor rollers 121 to perform the paper conveyance operation and rotates the sound generator 114a.

The interface 146 has, for example, a USB or other serial bus-based interface circuit and electrically connects with a not shown information processing apparatus (for example, personal computer, portable data terminal, etc.) to send and receive a read image and various types of information. Further, it is also possible to connect a flash memory etc., to the interface 146 so as to store the read image.

The storage unit 147 has a RAM (random access memory), ROM (read only memory), or other memory device, a hard disk or other fixed disk device, or flexible disk, optical disk, or other portable storage device. Further, the storage unit 147 stores a computer program, database, tables, etc., which are used in various processing of the paper conveying apparatus 100. The computer program may be installed on the storage unit 147 from a computer-readable, non-transitory medium such as a compact disk read only memory (CD-ROM), a digital versatile disk read only memory (DVD-ROM), or the like by using a well-known setup program or the like. Furthermore, the storage unit 147 stores the read image.

The central processing unit 150 is provided with a CPU (central processing unit) and operates based on a program which is stored in advance in the storage unit 147. Note that, the central processing unit 150 may also be comprised of a DSP (digital signal processor), LSI (large scale integrated circuit), ASIC (application specific integrated circuit), FPGA (field-programming gate array), etc.

The central processing unit 150 is connected to the operation button 106, first paper detector 110, second paper detector 113, ultrasonic sensor 116, third paper detector 119, first image capture unit 120a, second image capture unit 120b, first image A/D conversion unit 140a, second image A/D conversion unit 140b, first sound signal generator 141a, second sound signal generator 141b, drive unit 145, interface 146, and storage unit 147 and controls these units.

The central processing unit 150 control a drive operation of the drive unit 145, control a paper read operation of the image capture units 120, etc., to acquire a read image. Further, the central processing unit 150 has a control module 151, an image generator 152, an abnormal conveyance detector 153, a paper thickness detector 157, etc. The abnormal conveyance detector 153 has a sound jam detector 154, a position jam detector 155, a multifeed detector 156, etc., and determines whether the abnormal conveyance has occurred when the paper is being conveyed according to a detection method. The abnormal conveyance detector 153 changes the detection method based on the first sound signal. These units are functional modules which are loaded by software operating on a processor. Note that these units may also be configured by independent integrated circuits, microprocessors, firmware, etc.

Figure 4:
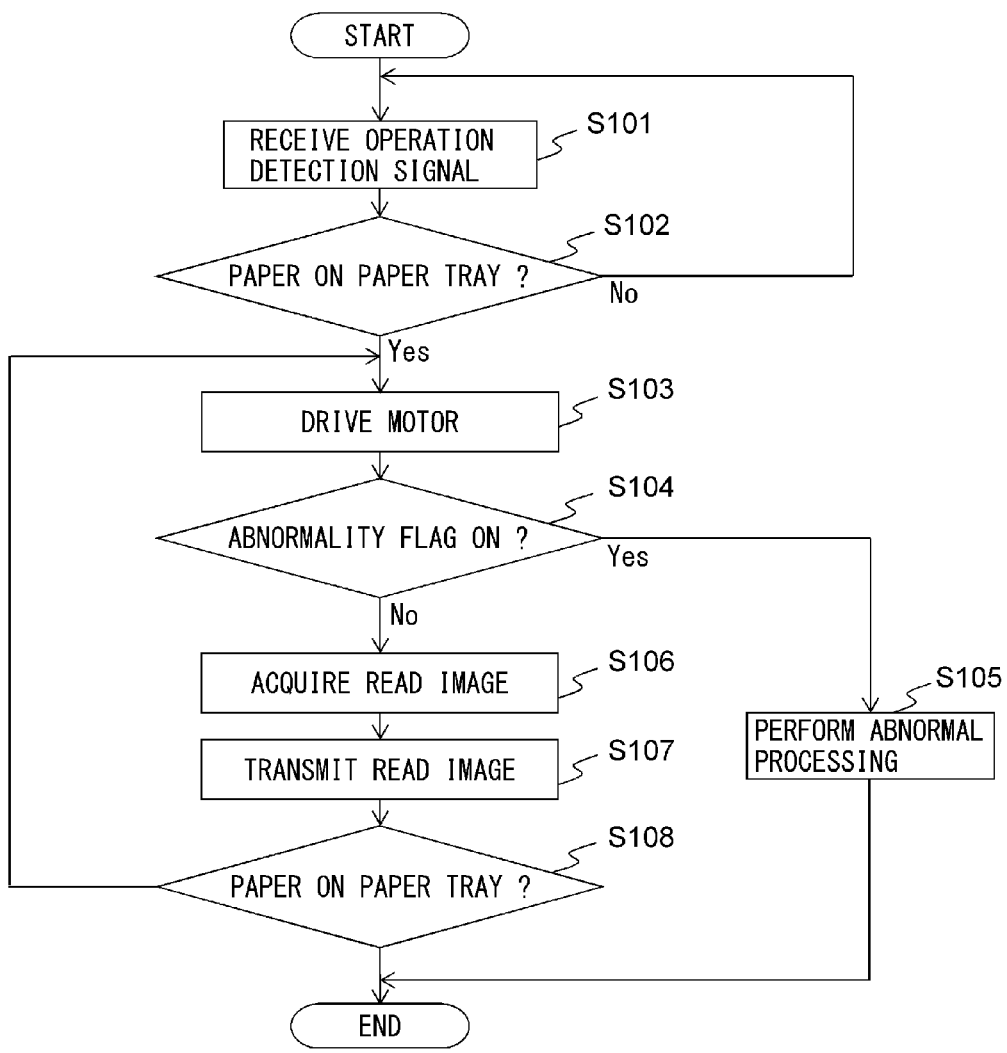
FIG. 4 is a flow chart which shows an example of an operation of overall processing of a paper conveying apparatus 100.

FIG. 4 is a flow chart which shows an example of operation of overall processing of the paper conveying apparatus 100.

Below, referring to the flow chart which is shown in FIG. 4, an example of the operation of the overall processing of the paper conveying apparatus 100 will be explained. Note that, the flow of the operation which is explained below is performed based on a program which is stored in advance in the storage unit 147 mainly by the central processing unit 150 in cooperation with the elements of the paper conveying apparatus 100.

First, the central processing unit 150 stands by until a user pushes the operation button 106 and an operation detection signal is received from the operation button 106 (step S101).

Next, the central processing unit 150 determines whether the paper tray 103 has a paper placed on it based on the first paper detection signal which was received from the first paper detector 110 (step S102).

If the paper tray 103 does not have a paper placed on it, the central processing unit 150 returns the processing to step S101 and stands by until newly receiving an operation detection signal from the operation button 106.

On the other hand, when the paper tray 103 has a paper placed on it, the central processing unit 150 drives the drive unit 145 to rotate the paper feed roller 111, retard roller 112, first conveyor roller 117, and second conveyor roller 121 and convey the paper (step S103).

Next, the control module 151 determines whether an abnormality flag is ON or not (step S104). This abnormality flag is set OFF at the time of startup of the paper conveying apparatus 100 and is set ON if a later explained abnormality detection processing determines that an abnormality has occurred.

When the abnormality flag is ON, the control module 151, as an abnormal processing, stops the drive unit 145 to stop the conveyance of the paper, uses a not shown speaker, LED (light emitting diode), etc. to notify the user of the occurrence of an abnormality, sets the abnormality flag OFF (step S105), and ends the series of steps.

On the other hand, when the abnormality flag is not ON, the image generator 152 makes the first image capture unit 120a and the second image capture unit 120b read the conveyed paper and acquires the read image through the first image A/D conversion unit 140a and the second image A/D conversion unit 140b (step S106).

Next, the central processing unit 150 transmits the acquired read image through the interface 146 to a not shown information processing apparatus (step S107). Note that, when not connected to an information processing apparatus, the central processing unit 150 stores the acquired read image in the storage unit 147.

Next, the central processing unit 150 determines whether the paper tray 103 has a paper remaining thereon based on the first paper detection signal which was received from the first paper detector 110 (step S108).

When the paper tray 103 has a paper remaining thereon, the central processing unit 150 returns the processing to step S103 and repeats the processing of steps S103 to S108. On the other hand, when the paper tray 103 does not have any paper remaining thereon, the central processing unit 150 ends the series of processing.

Figure 5:
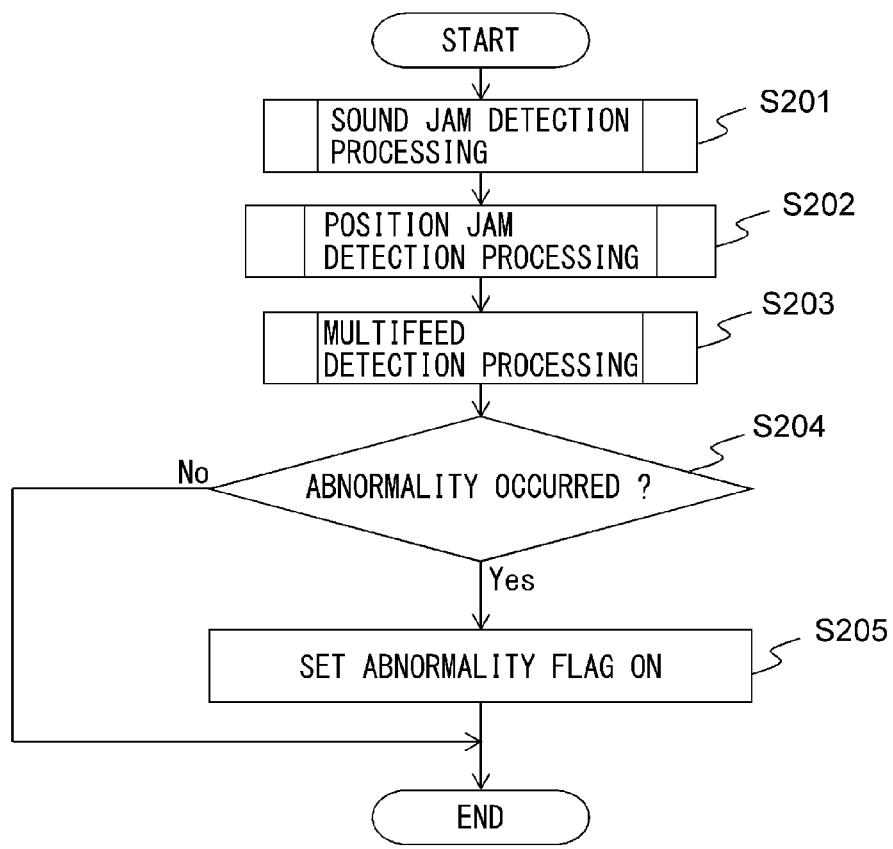
FIG. 5 is a flow chart which shows an example of an abnormality detection of the paper conveyance.

FIG. 5 is a flow chart which shows an example of an abnormality detection of the paper conveyance of a paper conveying apparatus 100.

The flow of operation which is explained below is executed based on a program which is stored in advance in the storage unit 147 mainly by the central processing unit 150 in cooperation with the elements of the paper conveying apparatus 100.

First, the sound jam detector 154 executes sound jam detection processing (step S201). In the sound jam detection processing, the sound jam detector 154 determines whether a jam has occurred based on the second sound signal which was acquired from the second sound signal generator 141b. Below, sometimes a jam which is determined to exist by the sound jam detector 154 based on a second sound signal will be called a "sound jam". Details of the sound jam detection processing will be explained later.

Next, the position jam detector 155 performs position jam detection processing (step S202). In the position jam detection processing, the position jam detector 155 determines the occurrence of a jam based on the second paper detection signal which is acquired from the second paper detector 113 and the third paper detection signal which is acquired from the third paper detector 119. Below, sometimes a jam which is determined to exist by the position jam detector 155 based on the second paper detection signal and third paper detection signal will be called a "position jam". Details of the position jam detection processing will be explained later.

Next, the multifeed detector 156 performs multifeed detection processing (step S203). In the multifeed detection processing, the multifeed detector 156 determines the occurrence of a multifeed of papers based on the ultrasonic signal which was acquired from the ultrasonic sensor 116. Details of the multifeed detection processing will be explained later.

Next, the control module 151 determines whether an abnormality has occurred in the paper conveyance processing (step S204). The control module 151 determines that an abnormality has occurred if at least one of a sound jam, position jam, and document multifeed has occurred. That is, it is determined that no abnormality has occurred when none of a sound jam, position jam, or document multifeed has occurred.

The control module 151 sets the abnormality flag to ON (step S205) and ends the series of steps when an abnormality occurs in the paper conveyance processing. On the other hand, when no abnormality occurs in the paper conveyance processing, it ends the series of steps without particularly performing any further processing. Note that, the flow chart which is shown in FIG. 5 is repeatedly executed every predetermined time interval.

Figure 6:
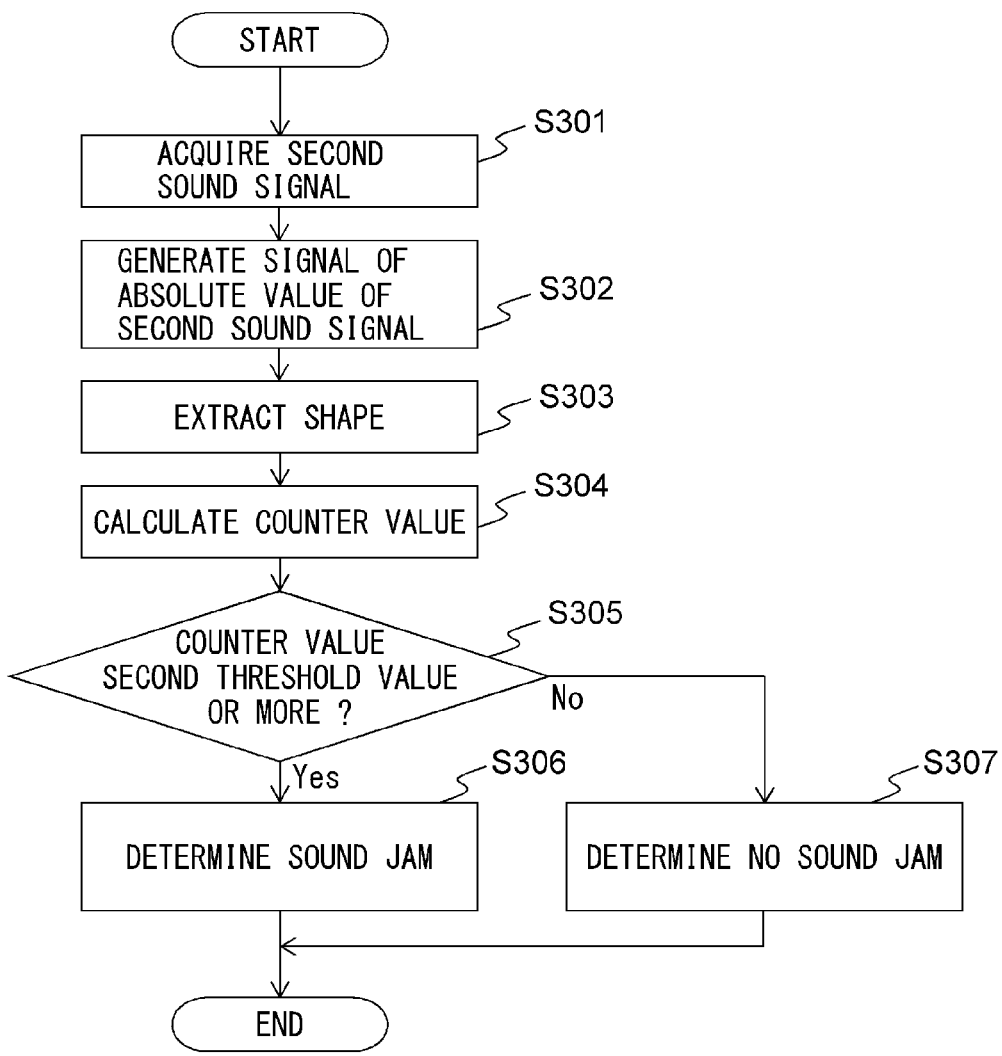
FIG. 6 is a flow chart which shows an example of operation of sound jam detection processing.

FIG. 6 is a flow chart which shows an example of operation of a sound jam detection processing.

The flow of operation which is shown in FIG. 6 is executed at step S201 of the flow chart which is shown in FIG. 5.

First, the sound jam detector 154 acquires a second sound signal from the second sound signal generator 141b (step S301).

Figure 7A:
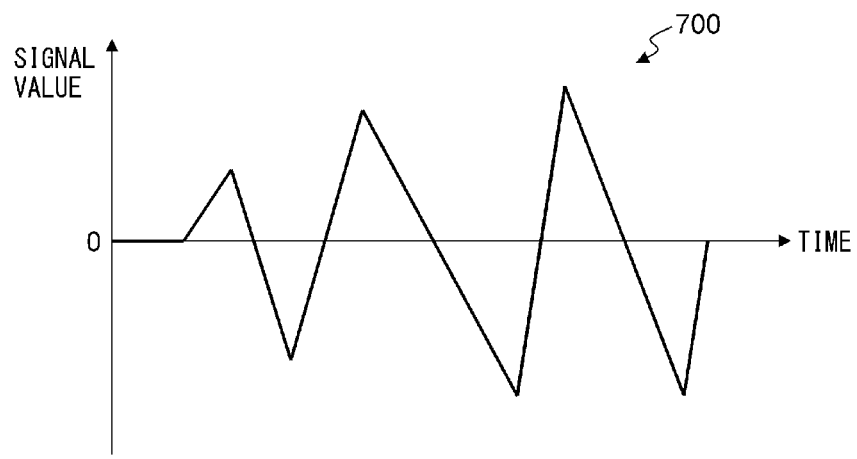
FIG. 7A is a graph which shows an example of a second sound signal.

FIG. 7A is a graph which shows an example of a second sound signal. The graph 700 which is shown in FIG. 7A shows a second sound signal which is acquired from the second sound signal generator 141b. The abscissa of graph 700 shows the time, while the ordinate shows the signal value of the second sound signal.

Next, the sound jam detector 154 generates a signal of the absolute value of the second sound signal received from the second sound signal generator 141b (step S302).

Figure 7B:
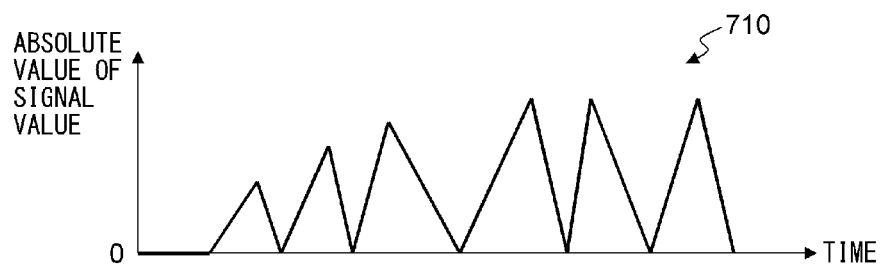
FIG. 7B is a graph which shows an example of a signal of an absolute value of a second sound signal.

FIG. 7B is a graph which shows an example of the signal of the absolute value of the second sound signal. The graph 710 which is shown in FIG. 7B shows the signal of the absolute value of the second sound signal of the graph 700. The abscissa of graph 710 shows the time, while the ordinate shows the signal of the absolute value of the second sound signal.

Next, the sound jam detector 154 extracts the shape of a signal of the absolute value of the sound signal (step S303). The sound jam detector 154 extracts the envelope as the shape of the signal of the absolute value of the second sound signal.

Figure 7C:
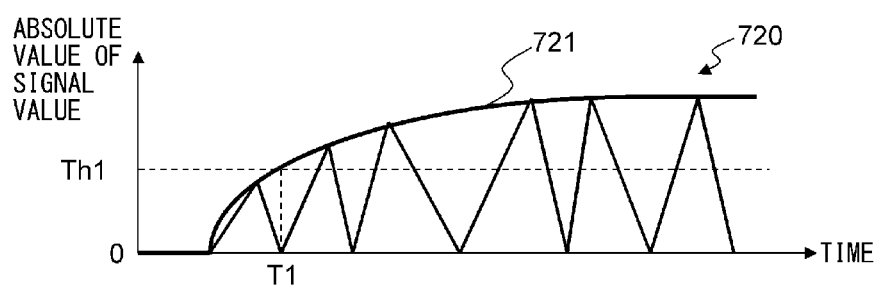
FIG. 7C is a graph which shows an example of a shape of a signal of an absolute value of a second sound signal.

FIG. 7C is a graph which shows an example of the shape of a signal of the absolute value of the second sound signal. The graph 720 which is shown in FIG. 7C shows the envelope 721 of the signal of the absolute value of the second sound signal of the graph 710. The abscissa of the graph 720 shows the time, while the ordinate shows the absolute value of the signal value of the second sound signal.

Next, the sound jam detector 154 calculates a counter value which it increases when the shape of the signal of the absolute value of the second sound signal is a first threshold value Th1 or more and which it decreases when it is less than the first threshold value Th1 (step S304). The sound jam detector 154 determines whether the value of the envelope 721 is the first threshold value Th1 or more at each predetermined time interval (for example, sampling intervals of second sound signal), increments the counter value when the value of the envelope 721 is the first threshold value Th1 or more, and decrements the counter value when it is less than the first threshold value Th1.

Figure 7D:
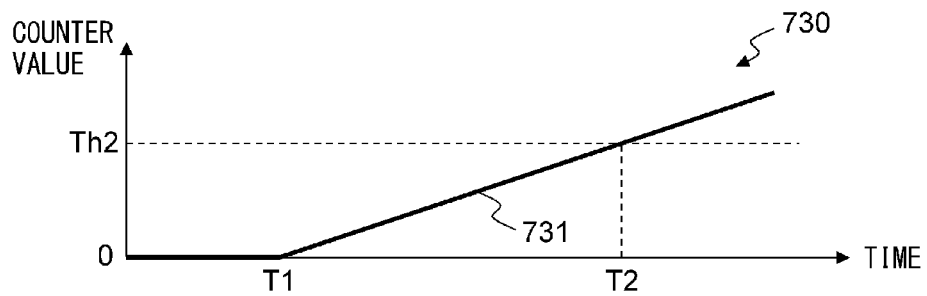
FIG. 7D is a graph which shows an example of a counter value.

FIG. 7D is a graph which shows an example of the counter value which is calculated for the shape of the signal of the absolute value of the second sound signal. The graph 730 which is shown in FIG. 7D expresses the counter value which is calculated for the envelope 721 of the graph 720. The abscissa of the graph 720 shows the time, while the ordinate shows the counter value.

Next, the sound jam detector 154 determines whether the counter value is a second threshold value Th2 or more (step S305). The sound jam detector 154 determines that a sound jam has occurred if the counter value is the second threshold value Th2 or more (step S306), determines that a sound jam has not occurred if the counter value is less than the second threshold value Th2 (step S307), and then ends the series of steps.

In FIG. 7C, the envelope 721 is the first threshold value Th1 or more at the time T1 and thereafter does not become less than the first threshold value Th1. For this reason, as shown in FIG. 7D, the counter value increases from the time T1 and becomes the second threshold value Th2 or more at the time T2, then the sound jam detector 154 determines that a sound jam has occurred.

Note that, at step S303, instead of acquiring the envelope as the shape of the signal of the absolute value of the second sound signal, the sound jam detector 154 may acquire a signal of the peak hold for the signal of the absolute value of the second sound signal (below, referred to as the "peak hold signal"). For example, the central processing unit 150 holds the local maximum value of the signal of the absolute value of the second sound signal for exactly a predetermined hold period and then attenuates it by a constant attenuation rate to acquire the peak hold signal.

Figure 8A:
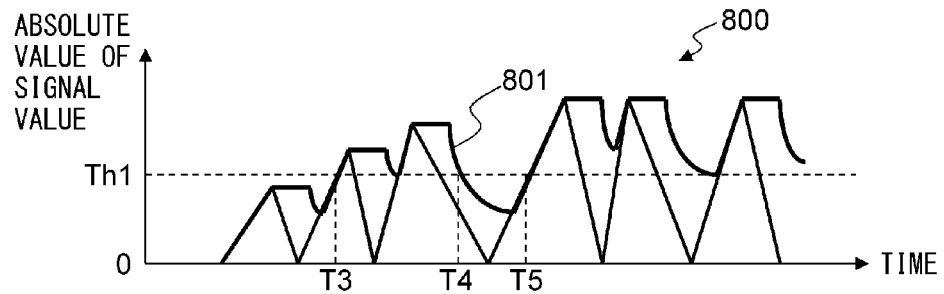
FIG. 8A is a graph which shows an example of a peak hold signal acquired from a second sound signal.
Figure 8B:
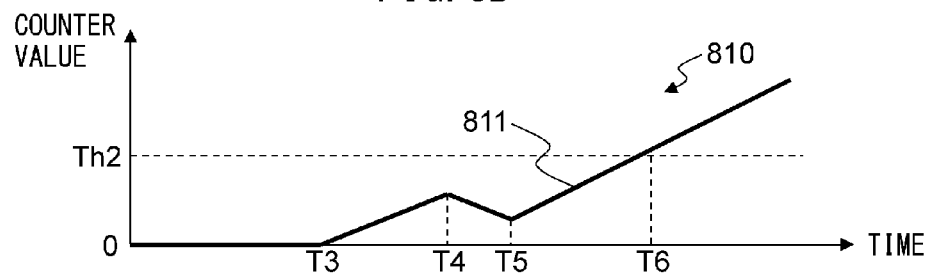
FIG. 8B is a graph which shows an example of a counter value.

FIG. 8A and FIG. 8B are views for explaining the processing for acquiring the peak hold signal from the second sound signal and determining whether a sound jam has occurred.

The graph 800 which is shown in FIG. 8A expresses the peak hold signal 801 for the signal of the absolute value of the second sound signal of the graph 710. The abscissa of the graph 800 shows the time, while the ordinate shows the absolute value of the signal value of the second sound signal.

The graph 810 which is shown in FIG. 8B shows the counter value which was calculated for the peak hold signal 801 of the graph 800. The abscissa of the graph 810 shows the time, while the ordinate shows the counter value. The peak hold signal 801 becomes the first threshold value Th1 or more at the time T3, becomes less than the first threshold value Th1 at the time T4, again becomes the first threshold value Th1 or more at the time T5, and does not become less than the first threshold value Th1 after that. For this reason, as shown in FIG. 8B, the counter value increases from the time T3, decreases from the time T4, again increases from the time T5, and becomes the second threshold value Th2 or more at the time T6, so it is determined that a sound jam has occurred.

Figure 9:
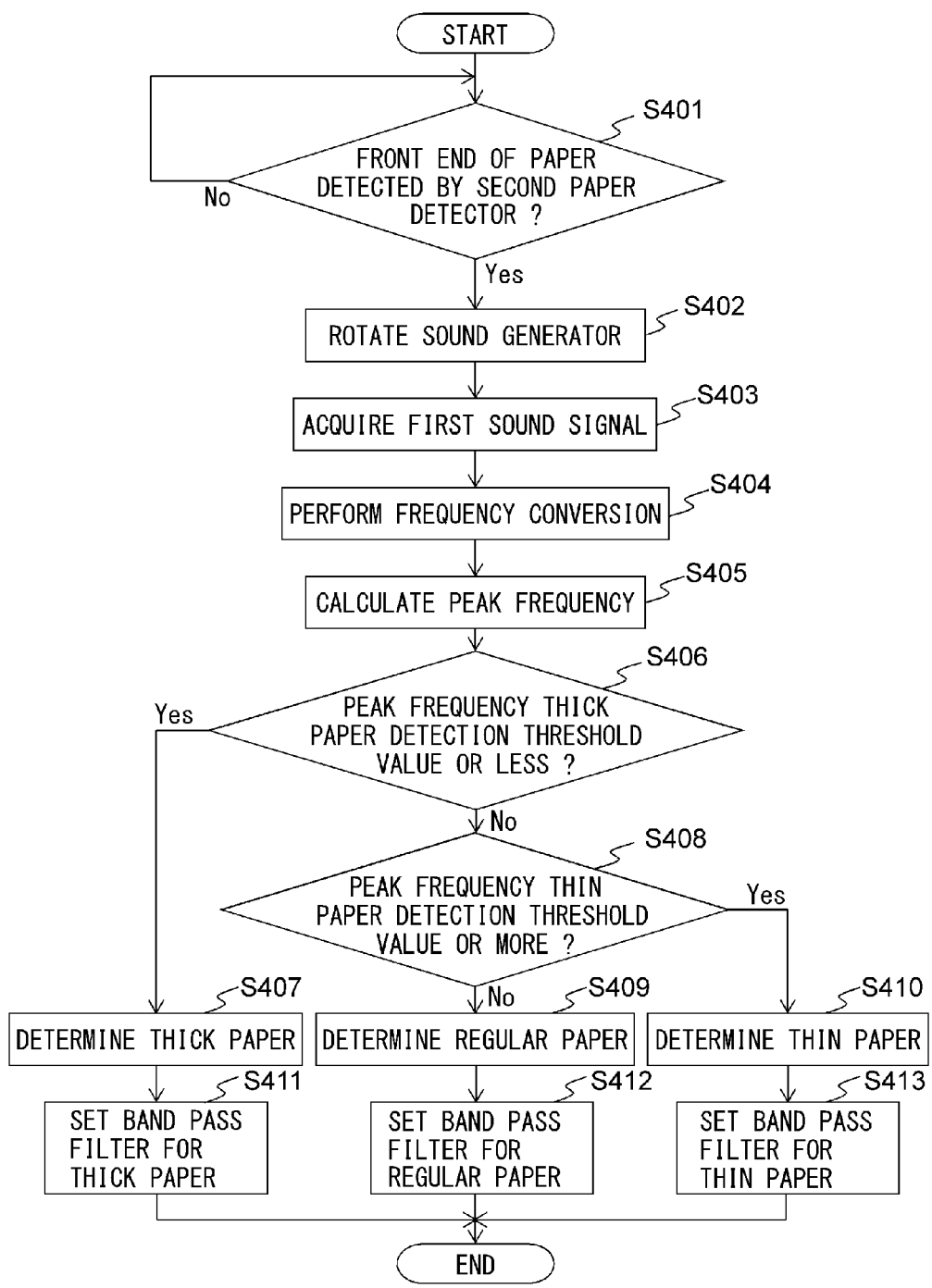
FIG. 9 is a flow chart which shows an example of operation of a paper thickness detection processing.

FIG. 9 is a flow chart which shows an example of the operation of the paper thickness detection processing.

The flow of operation which is explained below is executed mainly by the central processing unit 150 in cooperation with the elements of the paper conveying apparatus 100 based on a program which is stored in the storage unit 147 in advance. This flow chart is performed at the timing at which the central processing unit 150 drives the drive unit 145 to rotate the paper feed rollers 111 and retard rollers 112. Further, for the paper thickness detector 157, the sound jam detector 154 may also be used.

First, the paper thickness detector 157 stands by until the second paper detector 113 detects the front end of paper (step S401). The paper thickness detector 157 determines that the front end of paper has been detected at the position of the second paper detector 113 when the value of the second paper detection signal from the second paper detector 113 changes from a value which represents the state where there is no paper to a value which represents the state where there is paper.

Next, if the second paper detector 113 detects the front end of paper, the paper thickness detector 157 drives the drive unit 145 to rotate the sound generator 114a in the direction of the arrow mark A7 of FIG. 2 (step S402). Note that, it is preferable that the sound generator 114a generates sound by making the projecting parts 123a contact the paper in the range of within 10 mm from the front end so as to make the front end of the paper vibrate. Therefore, to make the projecting parts 123a contact the paper in the range of within 10 mm from the front end, the paper thickness detector 157 may rotate the sound generator 114a after the elapse of a predetermined time from when the second paper detector 113 detects the front end of the paper. The predetermined time may be determined from the conveyance speed of the paper and the position of the sound generator 114a.

Next, the paper thickness detector 157 acquires the first sound signal from the first sound signal generator 141a (step S403).

Next, the paper thickness detector 157 uses a fast Fourier transform (FFT) to convert the first sound signal in frequency and generate a frequency signal (step S404).

Next, the paper thickness detector 157 calculates the peak frequency at the frequency signal (step S405). The paper thickness detector 157 calculates the frequency at which the frequency signal takes the maximum value as the peak frequency.

Next, the paper thickness detector 157 determines whether the calculated peak frequency is a thick paper detection threshold value or less (step S406). The paper thickness detector 157 determines that the paper is thick paper if the peak frequency is the thick paper detection threshold value or less (step S407).

On the other hand, if the peak frequency is larger than the thick paper detection threshold value, the paper thickness detector 157 determines whether the peak frequency is a thin paper detection threshold value or more (step S408). The paper thickness detector 157 determines that the paper is regular paper if the peak frequency is less than the thin paper detection threshold value (step S409) and determines that the paper is thin paper if the peak frequency is the thin paper detection threshold value or more (step S410).

If the paper is thick paper, the paper thickness detector 157 sets the bandpass filter of the second filter 142b to a bandpass filter for thick paper use which passes only a signal of a predetermined low frequency band (200 Hz to 2 kHz) (step S411) and ends the series of steps.

If the paper is regular paper, the paper thickness detector 157 sets the bandpass filter of the second filter 142b to a bandpass filter for regular paper use which passes only a signal of a predetermined medium frequency band (500 Hz to 3 kHz) (step S412) and ends the series of steps.

If the paper is thin paper, the paper thickness detector 157 sets the bandpass filter of the second filter 142b to a bandpass filter for thin paper use which passes only a signal of a predetermined high frequency band (2 kHz to 5 kHz) (step S413) and ends the series of steps.

Figure 10:
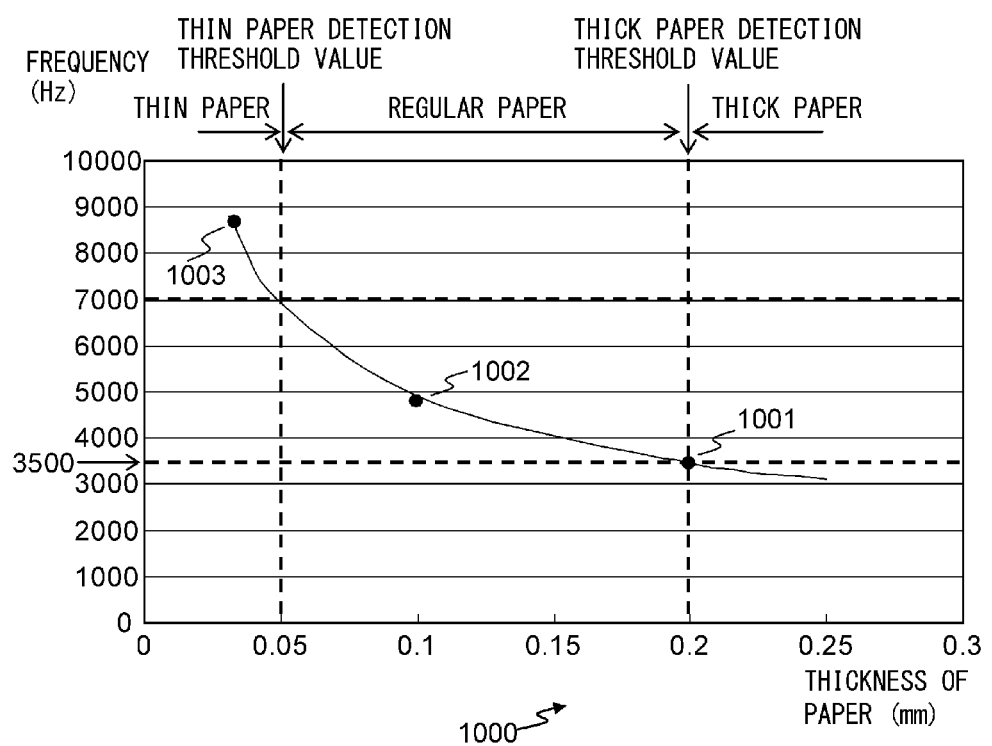
FIG. 10 is a graph which shows a relationship between a thickness of paper and a peak frequency.

FIG. 10 is a graph which shows an example of the relationship of the thickness of the paper and the peak frequency. In FIG. 10, the abscissa shows the thickness of the paper, while the ordinate shows the frequency.

The frequency band at which the signal strength becomes larger in sound at the time when a jam occurs by conveying a thickness 0.23 mm official postcard, becomes considerably lower than the frequency band at which the signal strength becomes larger in the sound at the time when a jam occurs by conveying a thickness 0.1 mm PPC (plain paper copier) paper. Therefore, to be able to differentiate between the case where an official postcard is conveyed and the case where PPC paper is conveyed so as to change the bandpass filter of the second filter 142b, as shown in FIG. 10, the thick paper detection threshold value is made the peak frequency 3500 Hz which corresponds to the paper thickness 0.20 mm.

Further, the frequency band which the signal strength becomes larger in sound at the time when a jam occurs by conveying a thickness 0.03 mm to 0.04 mm India paper, becomes considerably higher than the frequency band at which the signal strength becomes larger in the sound at the time when a jam occurs by conveying the above PPC paper. Therefore, to be able to differentiate between the case where India paper is conveyed and the case where PPC paper is conveyed so as to change the bandpass filter of the second filter 142b, as shown in FIG. 10, the thin paper detection threshold value is made the peak frequency 7000 Hz which corresponds to the paper thickness 0.05 mm.

At steps S406 and S408, the paper thickness detector 157 utilizes the thick paper detection threshold value and thin paper detection threshold value which are shown in FIG. 10 so as to determine whether the paper is thick paper, is regular paper, or is thin paper, from the peak frequency.

Below, the method of calculation of the graph which is shown in FIG. 10 will be explained.

FIG. 11 give graphs which show examples of frequency signals of sounds which are generated by making the sound generator 114a contact paper of different thicknesses.

Figure 11A:
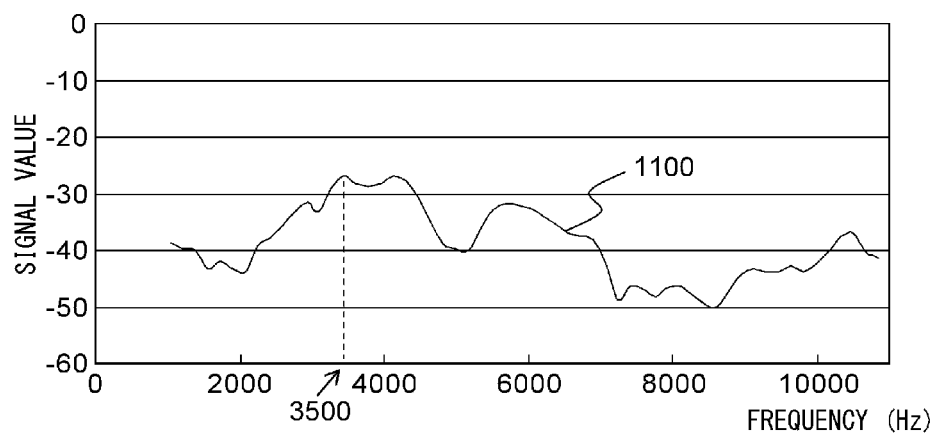
FIG. 11A is a graph which shows an example of a frequency signal.
Figure 11B:
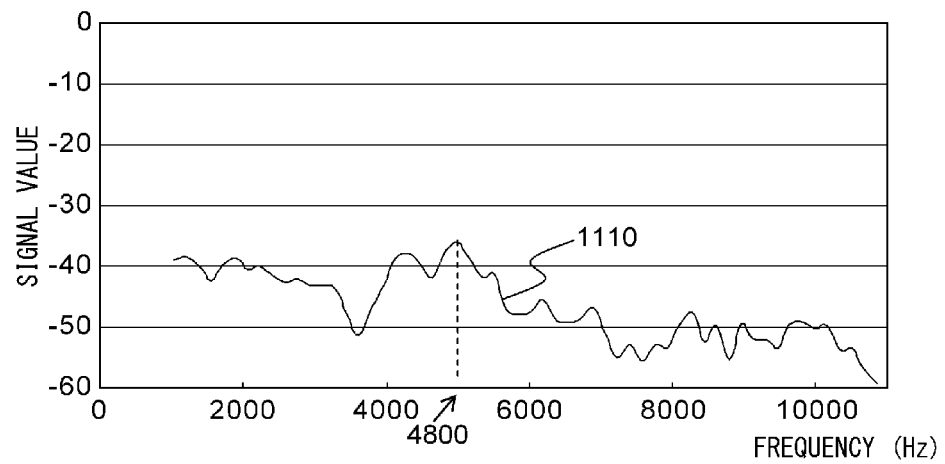
FIG. 11B is a graph which shows an example of a frequency signal.
Figure 11C:
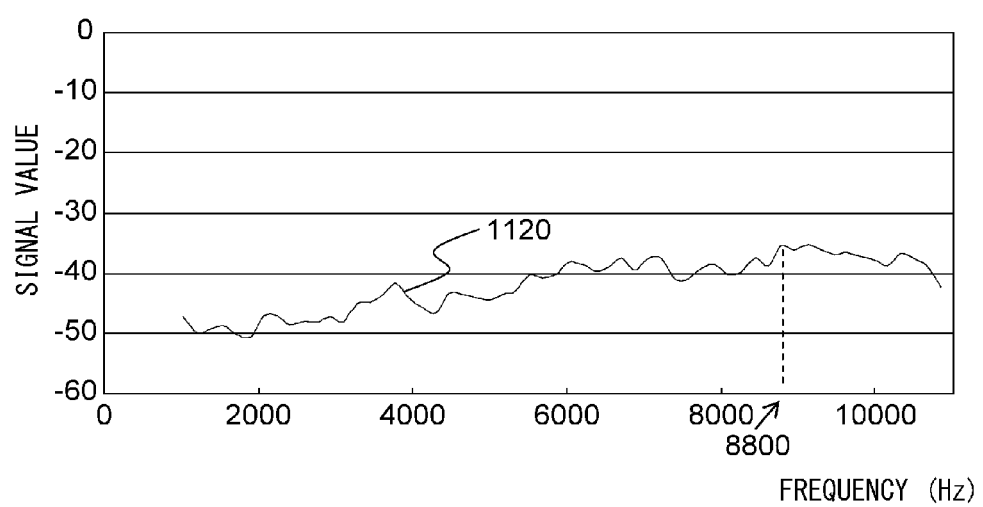
FIG. 11C is a graph which shows an example of a frequency signal.

In FIG. 11A, FIG. 11B, and FIG. 11C, the abscissas show the frequency and the ordinates show the signal value. The graph of FIG. 11A shows an example of the frequency signal 1100 for thickness 0.20 mm paper. The graph of FIG. 11B shows an example of a frequency signal 1110 for thickness 0.10 mm paper. The graph of FIG. 11C shows an example of a frequency signal for thickness 0.03 mm paper.

As shown in FIG. 11A, the peak frequency of the frequency signal 1100 is 3500 Hz, as shown in FIG. 11B, the peak frequency of the frequency signal 1110 is 4800 Hz, and, as shown in FIG. 11C, the peak frequency of the frequency signal 1120 is 8800 Hz.

Here, the three points 1001, 1002, and 1003 which are calculated from FIG. 11A, FIG. 11B, and FIG. 11C are used for approximation to calculate the graph of FIG. 10. For the approximation, the following equation was utilized.

[MATHEMATICAL 1]

$$f_n = \frac{k_n}{\sqrt{t}} \quad (1)$$

Here, $f_n$ is the natural frequency, "t" is the thickness of the paper (mm), and $k_n$ is a constant. That is, equation (1) means that the peak frequency of the frequency signal for paper which contacts the sound generator 114a is inversely proportional to ½ power of the thickness of the paper "t".

In general, when fastening one end of the spring of a spring constant k(N/m) and attaching a weight of a mass m (kg) to the other end, the natural frequency $f_n$ is expressed by the following equation (2).

[MATHEMATICAL 2]

$$f_n = \frac{1}{2\pi}\sqrt{\frac{k}{m}} \quad (2)$$

If considering equation (2) substituted for paper which contacts the sound generator 114a, since the mass m (kg) is proportional to the thickness of the paper "t", the natural frequency $f_n$ of equation (2) can be modified such as in equation (1). Therefore, when using the three points 1001, 1002, and 1003 of FIG. 11A, FIG. 11B, and FIG. 11C for approximation to calculate the graph of FIG. 10, equation (1) was used.

Note that, the thick paper detection threshold value, thin paper detection threshold value, the pass bands of the bandpass filters of the second filter 142b, and other values are not limited to the above values and can be suitably changed.

As explained above, when a jam occurs, the frequency band at which the signal strength tends to become greater becomes lower the thicker the paper and to become higher the thinner the paper. On the other hand, the sound which the second microphone 115b detects includes not only sound which is generated due to a jam, but also the sound of conveyance of the paper, drive sound of the motor, sound generated at the outside of the housing, and other noise of various frequency bands.

The paper conveying apparatus 100 can generate a second sound signal with a smaller ratio of noise to sound which is generated due to a jam, by cutting the components of frequency bands other than the frequency band where the signal strength becomes greater at the time of occurrence of a jam from the signal which the second microphone 115b outputs. The paper conveying apparatus 100 can eliminate the effects of the noise by setting the above-mentioned first threshold value Th1 at a value between the magnitude of the sound which is generated due to a jam and the magnitude of the noise.

As shown in FIG. 2, the second microphone 115b is provided near to the paper feed rollers 111 and retard rollers 112 so as to be able to detect sound which is generated at the paper feed rollers 111 and retard rollers 112 which separate the paper. On the other hand, the paper thickness detector 157 determines whether the paper is thick paper, is regular paper, or is thin paper based on the sound which is generated by the sound generator 114a and sets the bandpass filter of the second filter 142b. To enable the paper thickness detector 157 to set the bandpass filter at as early a timing as possible, it is preferable that the sound generator 114a and first microphone 115a are provided at the upstream side from the second microphone 115b.

Further, it is preferable that the first microphone 115a and second microphone 115b are provided at the downstream side from the paper feed rollers 111 and retard rollers 112 so as to prevent them from detecting sound which is generated at the outside of the housing as much as possible. Therefore, it is preferable that the sound generator 114a is also provided at the downstream side from the paper feed rollers 111 and retard rollers 112.

When a jam has occurred at the upstream side from the sound generator 114a, the paper thickness detector 157 has still not set the bandpass filter of the second filter 142b. Therefore, the sound jam detector 154 determines whether a jam has occurred based on the second sound signal which was filtered by the initially set bandpass filter. However, when a jam has occurred at the downstream side from the sound generator 114a, the paper thickness detector 157 determines the thickness of the paper and sets a suitable bandpass filter corresponding to the thickness of the paper. Therefore, the sound jam detector 154 can effectively determine whether a jam has occurred based on the second sound signal which was filtered by a suitable bandpass filter. Further, when a plurality of sheets of paper are conveyed, there is a high possibility of the sheets of the paper being the same type. It is possible to effectively determine whether a jam has occurred for the second and later sheets of paper based on the second sound signal which was filtered by a suitable bandpass filter.

Figure 12:
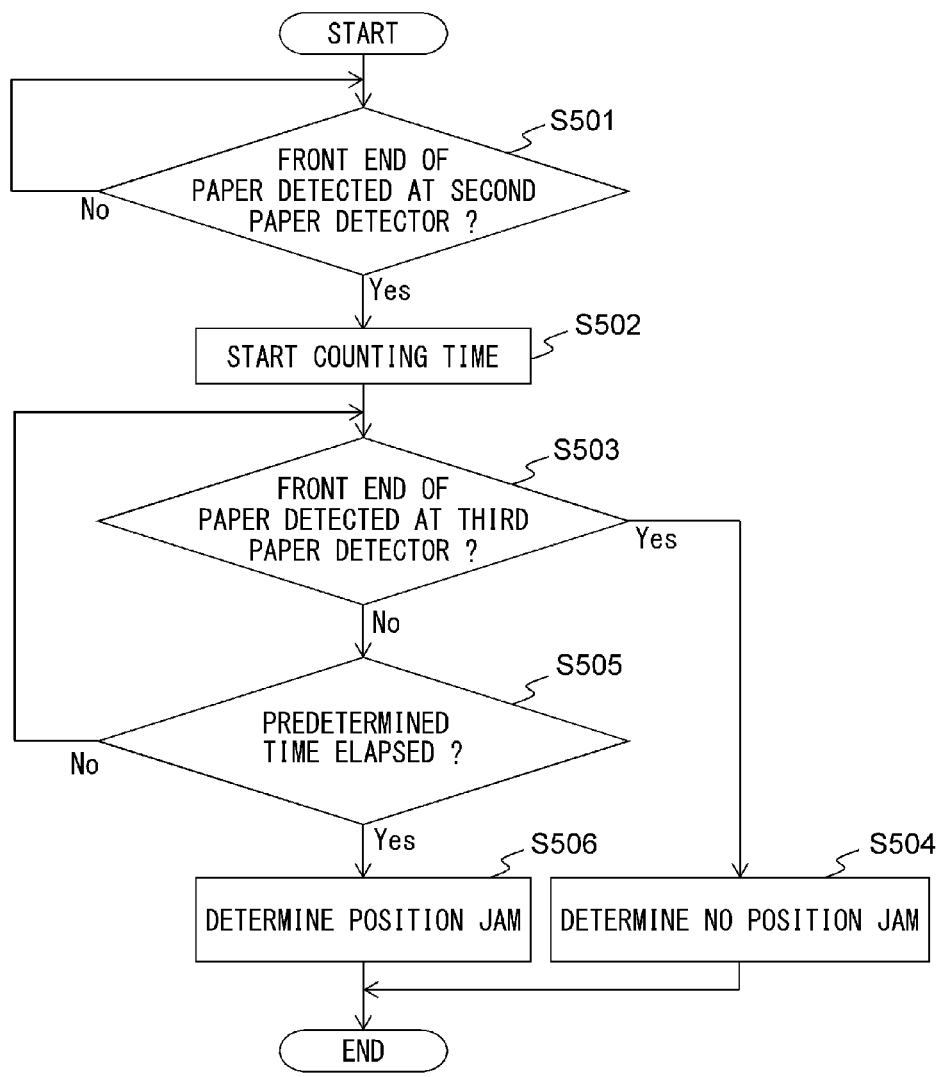
FIG. 12 is a flow chart which shows an example of operation of a position jam detection processing.

FIG. 12 is a flow chart which shows an example of operation of a position jam detection processing.

The flow of operation which is shown in FIG. 12 is executed at step S202 of the flow chart which is shown in FIG. 5.

First, the position jam detector 155 stands by until the front end of the paper is detected by the second paper detector 113 (step S501). The position jam detector 154 determines that the front end of the paper is detected at the position of the second paper detector 113, that is, downstream of the paper feed roller 111 and retard roller 112 and upstream of the first conveyor roller 117 and first driven roller 118, when the value of the second paper detection signal from the second paper detector 114 changes from a value which shows the state where there is no paper to a value which shows the state where there is one.

Next, when the second paper detector 114 detects the front end of a paper, the position jam detector 155 starts counting time (step S502).

Next, the position jam detector 155 determines whether the third paper detector 119 has detected the front end of the paper (step S503). The position jam detector 155 determines that the front end of the paper is detected at the position of the third paper detector 119, that is, downstream of the first conveyor roller 117 and first driven roller 118 and upstream of the image capture unit 120, when the value of the third paper detection signal from the third paper detector 119 changes from a value which shows the state where there is no paper to a value which shows the state where there is one.

When the third paper detector 119 detects the front end of a paper, the position jam detector 155 determines that no position jam has occurred (step S504) and ends the series of steps.

On the other hand, if the third paper detector 119 detects the front end of the paper, the position jam detector 155 determines whether a predetermined time (for example, 1 second) has elapsed from the start of counting time (step S505). If a predetermined time has not elapsed, the position jam detector 155 returns to the processing of step S503 and again determines whether the third paper detector 119 has detected the front end of the paper. On the other hand, when a predetermined time has elapsed, the position jam detector 155 determines that position jam has occurred (step S506) and ends the series of steps. Note that, when position jam detection processing is not required in the paper conveying apparatus 100, this may be omitted.

Note that, when the central processing unit 150 detects that the front end of a paper is downstream of the first conveyor roller 117 and the first driven roller 118 by the third paper detection signal from the third paper detector 119, it controls the drive unit 145 to stop the rotation of the paper feed roller 111 and retard roller 112 so that the next paper is not fed. After that, when the central processing unit 150 detects the rear end of the paper downstream of the paper feed roller 111 and the retard roller 112 by the second paper detection signal from the second paper detector 113, it again controls the drive unit 145 to rotate the paper feed roller 111 and retard roller 112 and convey the next paper. Due to this, the central processing unit 150 prevents a plurality of papers from being superposed in the conveyance path. For this reason, the position jam detector 155 may start counting the time at the point of time when the central processing unit 150 controls the drive unit 145 to rotate the paper feed roller 111 and the retard roller 112 and determine that a position jam has occurred when the third paper detector 119 does not detect the front end of a paper within a predetermined time.

Figure 13:
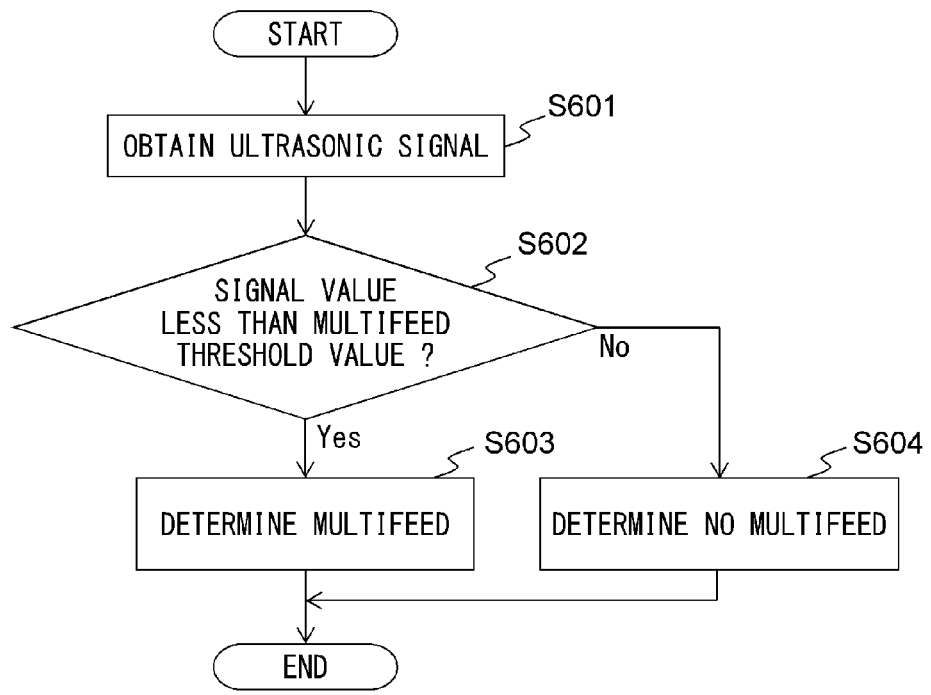
FIG. 13 is a flow chart which shows an example of operation of multifeed detection processing.

FIG. 13 is a flow chart which shows an example of operation of multifeed detection processing.

The flow of operation which is shown in FIG. 13 is executed at step S203 of the flow chart which is shown in FIG. 5.

First, the multifeed detector 156 acquires an ultrasonic signal from the ultrasonic sensor 116 (step S601).

Next, the multifeed detector 156 determines whether the signal value of the acquired ultrasonic signal is less than the multifeed detection threshold value (step S602).

Figure 14:
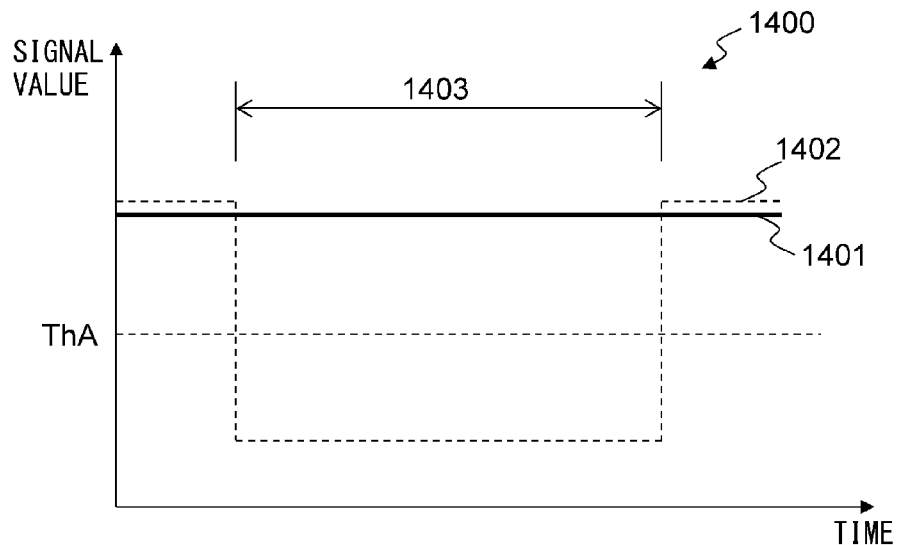
FIG. 14 is a view for explaining properties of an ultrasonic signal.

FIG. 14 is a view for explaining properties of an ultrasonic signal.

In the graph 1400 of FIG. 14, the solid line 1401 shows the characteristic of the ultrasonic signal in the case where a single paper is conveyed, while the broken line 1402 shows the characteristic of the ultrasonic signal in the case where multifeed of papers has occurred. The abscissa of the graph 1400 shows the time, while the ordinate shows the signal value of the ultrasonic signal. Due to the occurrence of multifeed, the signal value of the ultrasonic signal of the broken line 1402 falls in the section 1403. For this reason, it is possible to determine whether multifeed of papers has occurred by whether the signal value of the ultrasonic signal is less than the multifeed detection threshold value ThA.

The multifeed detector 156 determines that multifeed of the papers has occurred when the signal value of the ultrasonic signal is less than the multifeed detection threshold value (step S603), determines that multifeed of the papers has not occurred when the signal value of the ultrasonic signal is the multifeed detection threshold value or more (step S604), and ends the series of steps. Note that, when multifeed detection processing is not necessary in the document conveying apparatus, this may be omitted.

As explained above in detail, the paper conveying apparatus 100 operates in accordance with the flow charts which are shown in FIG. 4, FIG. 5, FIG. 6, and FIG. 9 so as to determine the thickness of the paper based on the sound which is generated by making the sound generator 114a contact the paper. The paper conveying apparatus 100 can suitably set the bandpass filter to be applied to the sound which is used for detection of a jam in accordance with the thickness of the paper and can precisely determine whether a sound jam has occurred.

Figure 15:
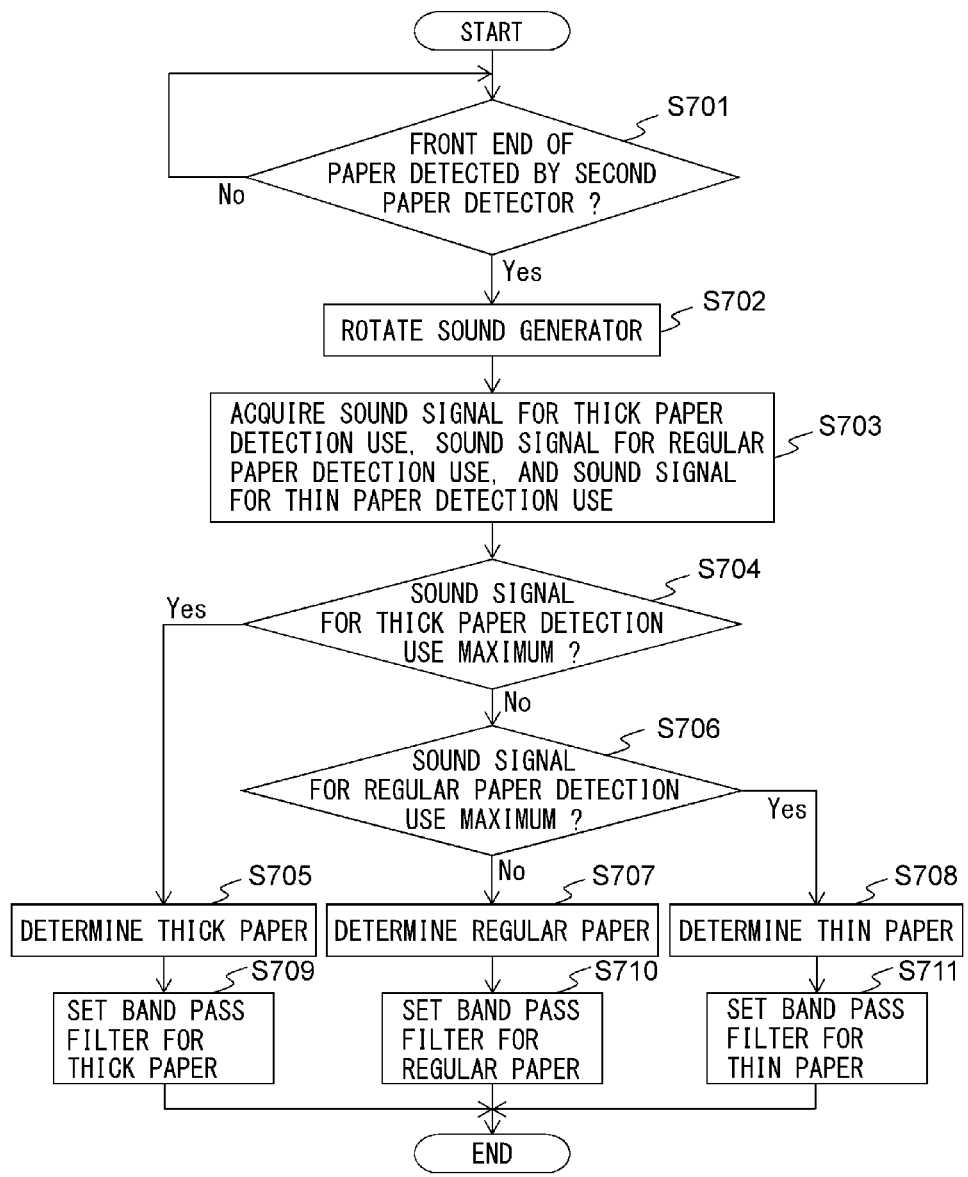
FIG. 15 is a flow chart which shows another example of an operation of paper thickness detection processing.

FIG. 15 is a flow chart which shows another example of the operation of paper thickness detection processing.

This flow chart can be performed by the paper conveying apparatus 100 instead of the above-mentioned flow chart which is shown in FIG. 9. In the flow chart which is shown in FIG. 15, unlike the flow chart which is shown in FIG. 9, the paper thickness detector 157 does not determine the paper thickness based on the frequency signal, but determines the paper thickness based on a frequency component of the first sound signal. The processing of steps S701 to S702 and S709 to 711 which are shown in FIG. 15 is the same as the processing of steps S401 to S402 and S411 to S413 which are shown in FIG. 9, so explanations will be omitted. Below, only the processing of steps S703 to S708 will be explained.

When this flow chart is performed, the first filter 142a is provided with a plurality of bandpass filters which pass the frequency band for thick paper use, frequency band for regular paper use, and frequency band for thin paper use. In the present example, the frequency band for thick paper use was made 3400 Hz to 3600 Hz, the frequency band for regular paper use was made 4700 Hz to 4900 Hz, and the frequency band for thin paper use was made 8700 Hz to 8900 Hz.

The first sound signal generator 141a outputs a first sound signal acquired by applying the bandpass filter for thick paper use to the signal which the first microphone 115a outputs (below, referred to as the "sound signal for thick paper detection use"). Further, the first sound signal generator 141a outputs a first sound signal acquired by applying the bandpass filter for regular paper use to the signal which the first microphone 115a outputs (below, referred to as the "sound signal for regular paper detection use"). Further, the first sound signal generator 141a outputs a first sound signal acquired by applying the bandpass filter for thin paper use to the signal which the first microphone 115a outputs (below, referred to as the "sound signal for thin paper detection use").

At step S703, the paper thickness detector 157 acquires the sound signal for thick paper detection use, sound signal for regular paper detection use, and sound signal for thin paper detection use from the first sound signal generator 141a.

Next, the paper thickness detector 157 determines whether the signal level of the sound signal for thick paper detection use is the largest among the sound signal for thick paper detection use, sound signal for regular paper detection use, and sound signal for thin paper detection use (step S704). The paper thickness detector 157 determines that the paper is thick paper if the signal level of the sound signal for thick paper detection use is the largest (step S705).

On the other hand, if the signal level of the sound signal for thick paper detection use is not the largest, the paper thickness detector 157 determines whether the signal level of the sound signal for thin paper detection use is the largest (step S706). If the signal level of the sound signal for thin paper detection use is not the largest, the paper thickness detector 157 determines that the paper is regular paper (step S707), while if the signal level of the sound signal for thin paper detection use is the largest, the paper thickness detector 157 determines that the paper is thin paper (step S708).

As explained above in detail, the paper conveying apparatus 100 operates in accordance with the flow charts which are shown in FIG. 4, FIG. 5, FIG. 6, and FIG. 15 so as to determine the thickness of the paper based on the frequency component of the sound which is generated by making the sound generator 114a contact the paper. The paper conveying apparatus 100 can suitably set the bandpass filter to be used for the sound which is used for detection of a jam corresponding to the thickness of the paper and can precisely determine whether a sound jam has occurred.

FIG. 16 is a view for explaining another example of a sound generator.

Figure 16A:
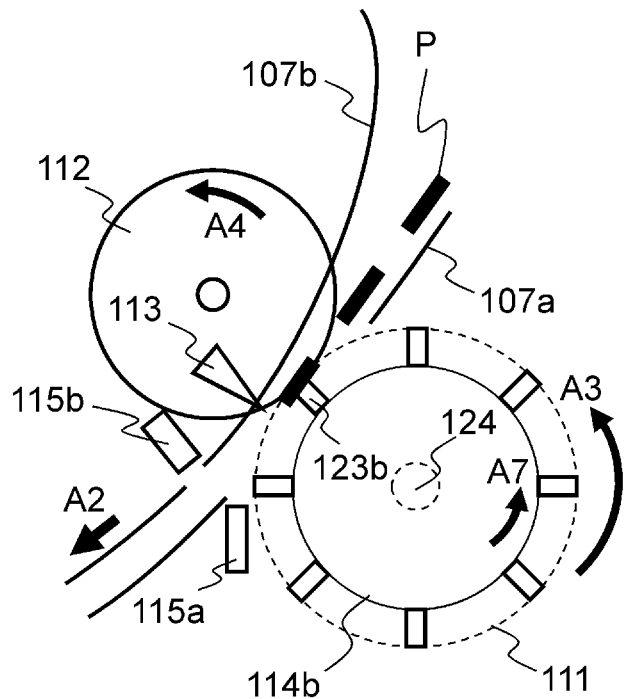
FIG. 16A is a view for explaining another sound generator 114b.

The sound generator 114b which is shown in FIG. 16A is used instead of the sound generator 114a which is shown in FIG. 2. The sound generator 114b is attached to a shaft 124 of the paper feed rollers 111 and rotates along with rotation of the paper feed rollers 111. At the outer circumferential surface of the sound generator 114b, projecting parts 123b which contact the paper P are provided. When the sound generator 114b is used, in the flow chart of FIG. 9, the processing of steps S401 and S402 is omitted. The central processing unit 150 drives the drive unit 145 to rotate the paper feed rollers 111, then immediately performs processing to acquire the first sound signal of step S403.

Figure 16B:
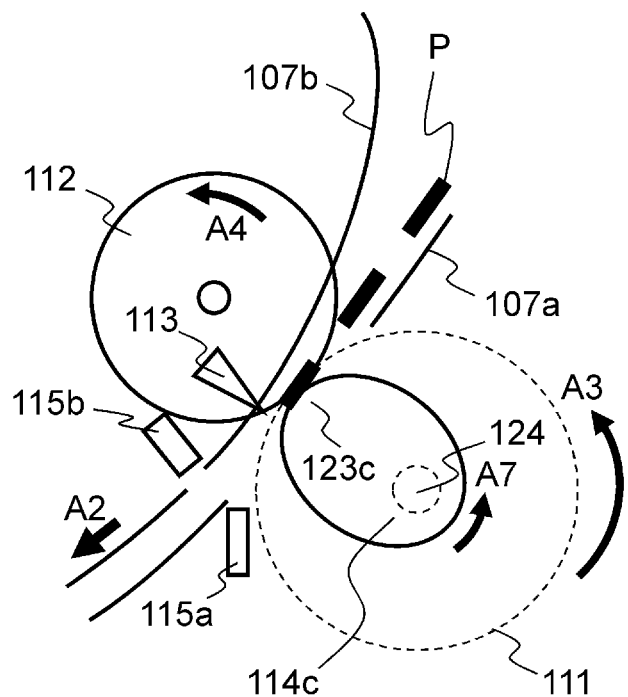
FIG. 16B is a view for explaining another sound generator 114c.

The sound generator 114c which is shown in FIG. 16B is used instead of the sound generator 114a which is shown in FIG. 2. The sound generator 114c is attached to the shaft 124 of the paper feed rollers 111 and rotates along with rotation of the paper feed rollers 111. The sound generator 114c has an off-centered structure and generates sound when an end part 123c at the opposite side to the part which is attached to the shaft 124 contacts the paper P. When the sound generator 114c is used, at the flow chart of FIG. 9, the processing of step S401 and S402 is omitted. The central processing unit 150 drives the drive unit 145 to rotate the paper feed rollers 111, then immediately performs processing to acquire the first sound signal of step S403.

Figure 16C:
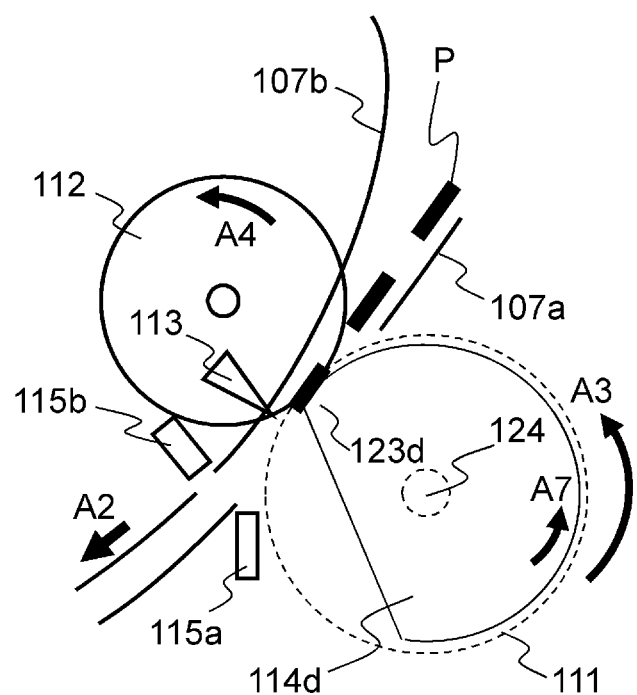
FIG. 16C is a view for explaining another sound generator 114d.

The sound generator 114d which is shown in FIG. 16C is used instead of the sound generator 114a which is shown in FIG. 2. The sound generator 114d is attached to the shaft 124 of the paper feed rollers 111 and rotates along with rotation of the paper feed rollers 111. The sound generator 114d has a partially cut circular structure. One end 123d of the cut part contacts the paper P to generate sound. When the sound generator 114d is used, at the flow chart of FIG. 9, the processing of steps S401 and S402 is omitted. The central processing unit 150 drives the drive unit 145 to rotate the paper feed rollers 111, then immediately performs processing to acquire the first sound signal of step S403.

Further, as the sound generator, it is also possible to provide a rubber strip or projecting part on the lower guide 107a of the paper conveyance path and generate a sound when paper passes the position where that rubber strip or projecting part is provided.

As explained above in detail, the paper conveying apparatus 100 determines the thickness of the paper based on the sound which is generated by the sound generator 114b, 114c, or 114d, so it is possible to suitably set the bandpass filter to be used for the sound which is used for detection of a jam.

Furthermore, in the paper conveying apparatus 100, the sound generator 114b, 114c, or 114d is directly attached to the shaft 124 of the paper feed rollers 111, so the drive transmitting means for driving the sound generator 114b, 114c, or 114d can be omitted and the cost of the apparatus can be reduced.

FIG. 17 is a flow chart which shows still another example of the operation of the paper thickness detection processing.

This flow chart can be performed by the paper conveying apparatus 100 instead of the above-mentioned flow chart which is shown in FIG. 9. In the flow chart which is shown in FIG. 17, unlike the flow chart which is shown in FIG. 9, the paper thickness detector 157 changes the multifeed detection threshold value when detecting thick paper. The processing of steps S801 to S811 and S813 to S814 which are shown in FIG. 17 is the same as the processing of steps S401 to S411 and S412 to S413 which are shown in FIG. 9, so explanations will be omitted. Below, only the processing of step S812 will be explained. Further, in the flow chart which is shown in FIG. 17, the multifeed detector 156 may also be also used for the paper thickness detector 157.

The paper thickness detector 157 reduces the multifeed detection threshold value to change the detection method of multifeed when it determines the paper is thick paper at step S807 (step S812).

Figure 18:
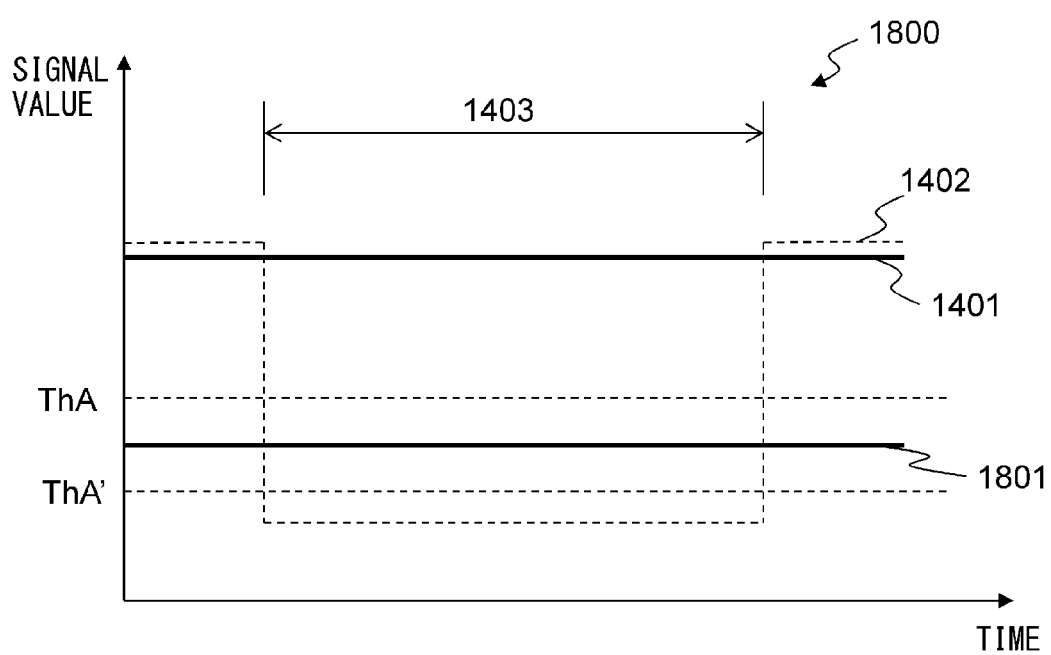
FIG. 18 is a view for explaining properties of an ultrasonic signal.

FIG. 18 is a view for explaining properties of an ultrasonic signal when thick paper is being conveyed.

In the graph 1800 of FIG. 18, in the same way as the graph 1400 of FIG. 14, the solid line 1401 shows the characteristic of the ultrasonic signal in the case where a single sheet of regular paper is being conveyed, while the dotted line 1402 shows the characteristic of the ultrasonic signal in the case where multifeed of regular papers has occurred. On the other hand, the solid line 1801 shows the characteristic of the ultrasonic signal in the case where just one sheet of thick paper is being conveyed. If thick paper is conveyed, the signal value of the ultrasonic signal becomes smaller than the multifeed detection threshold value ThA, so the multifeed detector 156 erroneously determines that multifeed of papers has occurred.

The paper thickness detector 157 sets the multifeed detection threshold value to a value ThA' between the signal value of the ultrasonic signal at the section 1403 when multifeed of regular papers has occurred and the signal value of the ultrasonic signal when just one sheet of thick paper is being conveyed.

As explained above in detail, the paper conveying apparatus 100 operates in accordance with the flow charts which are shown in FIG. 4, FIG. 5, FIG. 6, and FIG. 17 to determine the thickness of paper based on the sound which is generated by making the sound generator 114a contact the paper. The paper conveying apparatus 100 can suitably set the multifeed detection threshold value in accordance with the thickness of the paper and can precisely determine whether multifeed has occurred.

Figure 19:
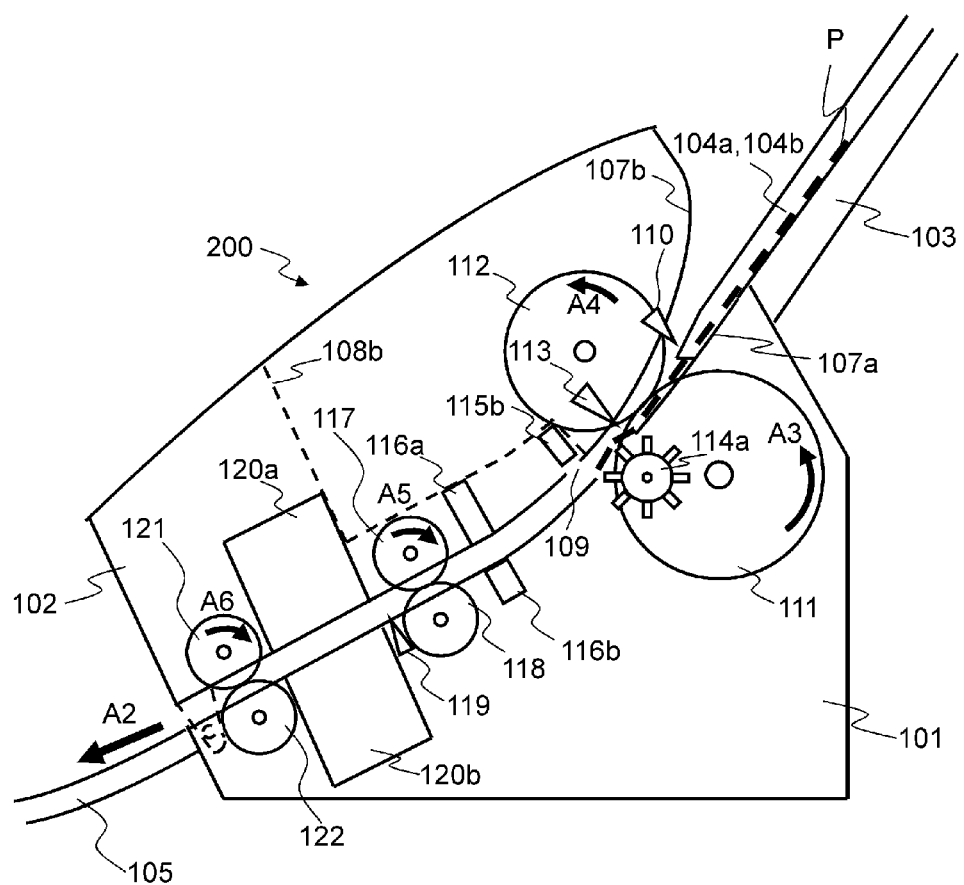
FIG. 19 is a view for explaining a conveyance route at an inside of a paper conveying apparatus 200 according to another embodiment.

FIG. 19 is a view for explaining a conveyance route inside of a paper conveying apparatus 200 according to another embodiment.

The paper conveying apparatus 200 which is shown in FIG. 19 omits the first microphone 115a of the paper conveying apparatus 100 which is shown in FIG. 2. In this paper conveying apparatus 200, the second microphone 115b acts as the first microphone 115a. The second microphone 115b detects the sound which the paper generates during conveyance and the sound which is generated due to the sound generator 114a.

Figure 20:
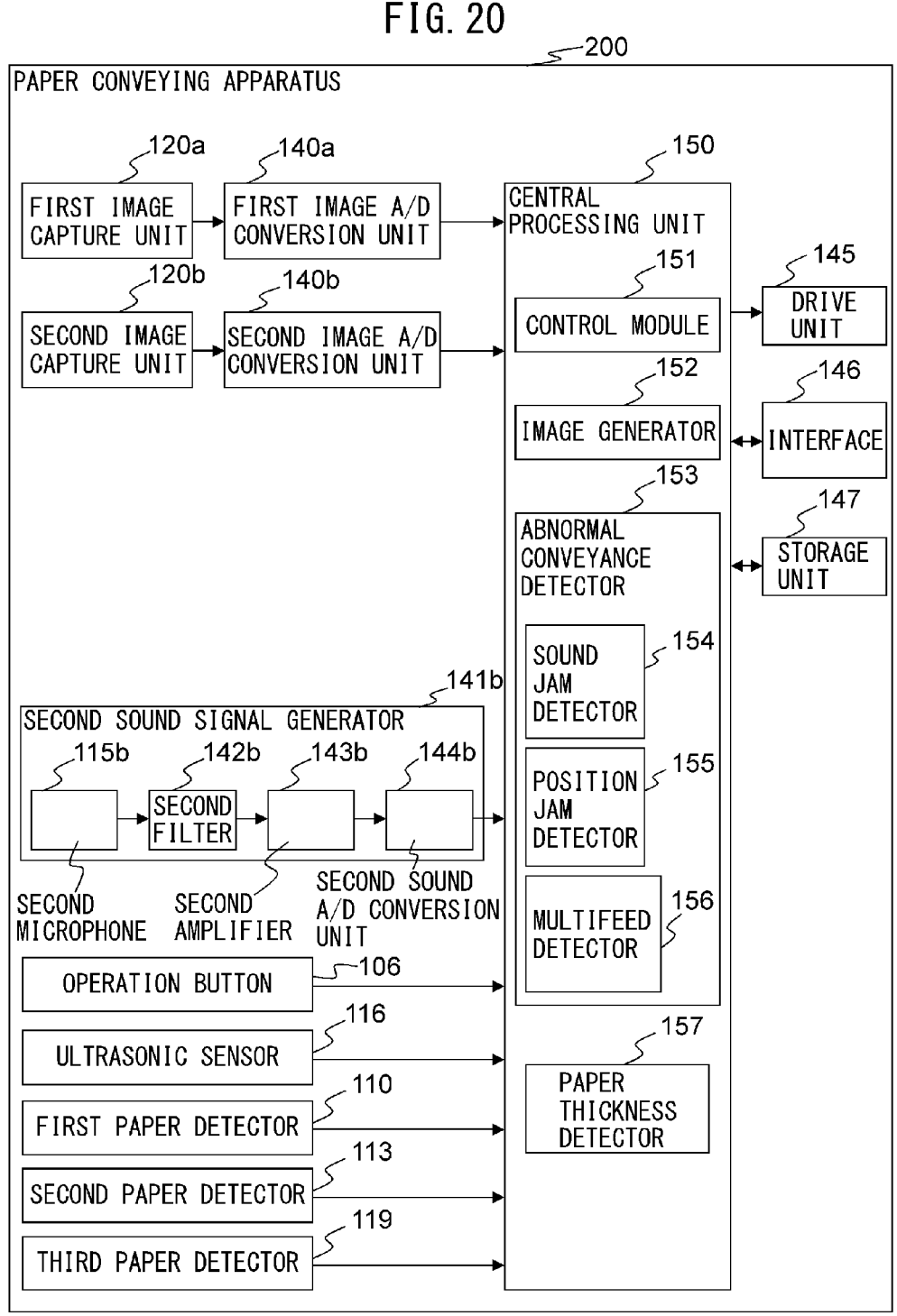
FIG. 20 is a block diagram which shows an example of a schematic configuration of a paper conveying apparatus 200.

FIG. 20 is a block diagram which shows an example of the schematic configuration of the paper conveying apparatus 200.

The paper conveying apparatus 200 omits the first sound signal generator 141a among the parts of the paper conveying apparatus 100 which is shown in FIG. 3. In the paper conveying apparatus 200, the second sound signal generator 141b acts as the first sound signal generator 141a, while the paper thickness detector 157 determines the thickness of the conveyed paper based on the second sound signal.

In the paper conveying apparatus 200, the paper thickness detector 157 acquires the second sound signal from the second sound signal generator 141b at step S403 of FIG. 9 and generates a frequency signal acquired by converting the second sound signal in frequency at step S404.

As explained above in detail, in the paper conveying apparatus 200, the second microphone 115b acts as the first microphone 115a, so the hardware can be lightened and the hardware cost can be reduced.

Figure 21:
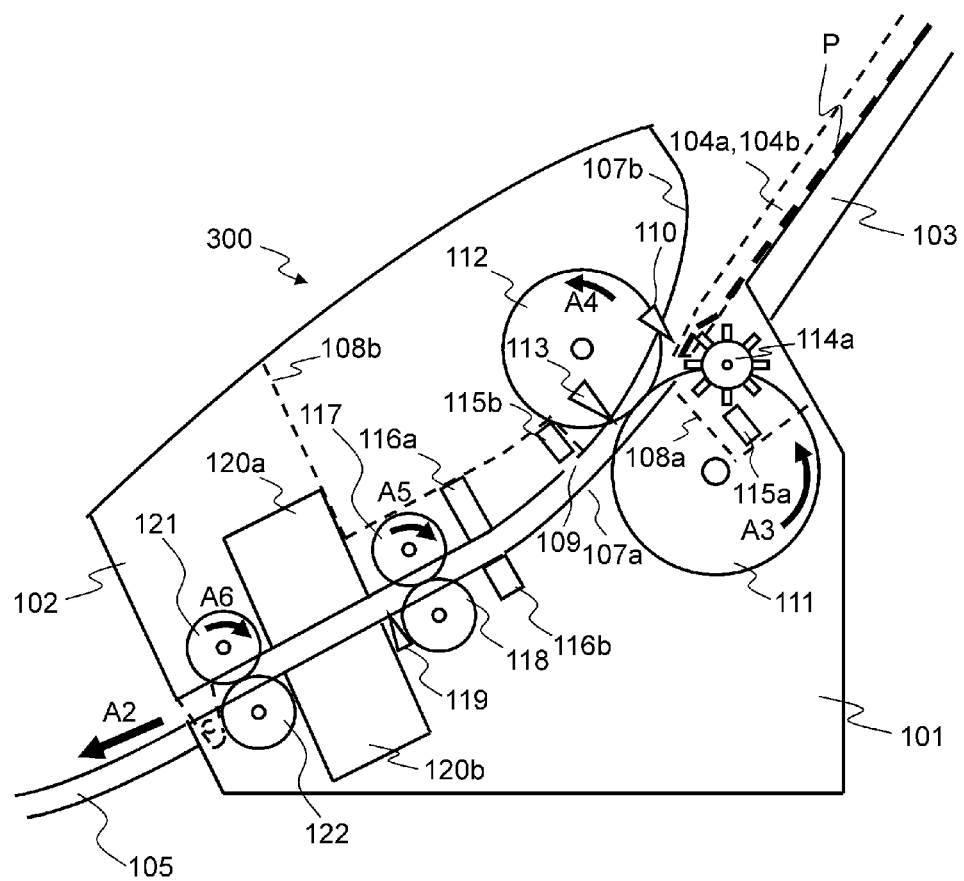
FIG. 21 is a view for explaining an example of a conveyance route at the inside of another paper conveying apparatus 300 according to still another embodiment.

FIG. 21 is a view for explaining an example of conveyance route inside of another paper conveying apparatus 300 according to still another embodiment.

The paper conveying apparatus 300 which is shown in FIG. 21 shifts the positions of the sound generator 114a and first microphone 115a of the paper conveying apparatus 100 which is shown in FIG. 2 to upstream of the paper feed rollers 111 and retard rollers 112.

Figure 22:
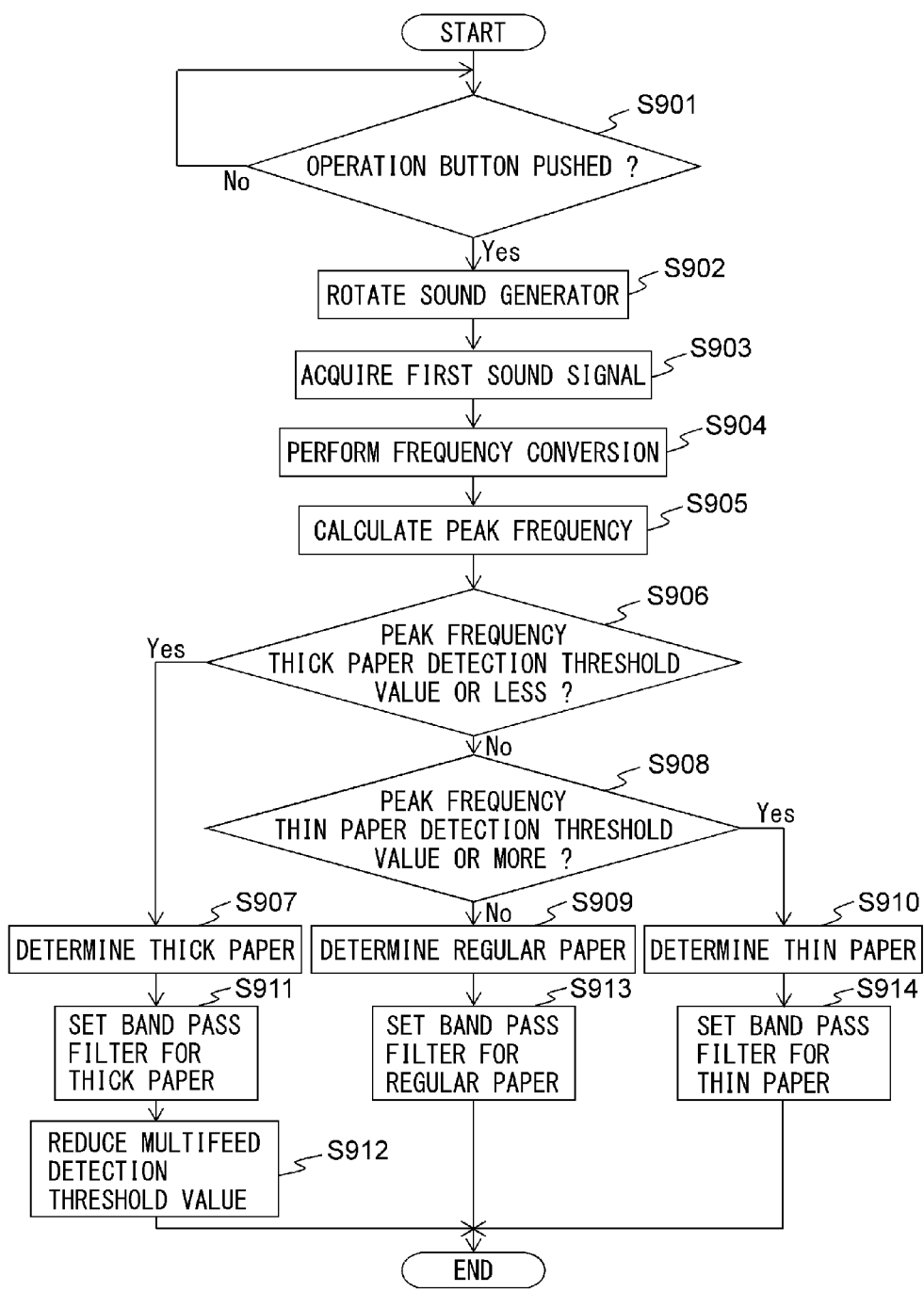
FIG. 22 is a flow chart which shows still another example of an operation of paper thickness detection processing.

FIG. 22 is a flow chart which shows still another example of the operation of the paper thickness detection processing.

This flow chart can be performed by the paper conveying apparatus 300 instead of the above-mentioned flow chart which is shown in FIG. 17. Unlike the flow chart which is shown in FIG. 17, the flow chart which is shown in FIG. 22 is performed before the central processing unit 150 drives the drive unit 145 and rotates the paper feed rollers 111 and retard rollers 112. The processing of steps S903 to S914 which are shown in FIG. 22 is the same as the processing of steps S803 to S814 which are shown in FIG. 17, so explanations will be omitted. Below, only the processing of steps S901 to S902 will be explained.

At step S901, the paper thickness detector 157 stands by until the user pushes the operation button 106 and it receives an operation detection signal from the operation button 106.

Next, the paper thickness detector 157 drives the drive unit 145 to rotate the sound generator 114a if detecting that the operation button 106 has been pushed (step S902).

On the other hand, at step S103 of FIG. 4, the central processing unit 150 stands by until the paper thickness detection processing of FIG. 22 has been completed. The central processing unit 150 drives the drive unit 145 to rotate the paper feed rollers 111, retard rollers 112, first conveyor rollers 117, and second conveyor rollers 121 and make the paper be conveyed after the bandpass filter of the second filter 142b and multifeed detection threshold value are set.

That is, in the paper conveying apparatus 300, the sound generator 114a contacts paper in a state placed on the paper tray 103 to make it generate sound, the paper thickness detector 157 determines the thickness of paper before the paper is conveyed, and the bandpass filter and multifeed detection threshold value are set. Therefore, in the paper conveying apparatus 300, a bandpass filter and a multifeed detection threshold value in accordance with the thickness of the conveyed paper can be reliably set before the sound jam detection processing and multifeed detection processing are performed.

As explained above in detail, the paper conveying apparatus 100 can operate in accordance with the flow charts which are shown in FIG. 4, FIG. 5, FIG. 6, and FIG. 22 so as to reliably set the bandpass filter and multifeed detection threshold value before the paper is conveyed. Therefore, the paper conveying apparatus 100 can precisely determine whether a sound jam has occurred and whether a multifeed has occurred.

According to the paper conveying apparatus and the abnormality detection method, and the computer-readable, non-transitory medium, the detection method of an abnormality when paper is conveyed is changed based on the sound which is generated by making the sound generator contact the paper, so it becomes possible to precisely determine whether an abnormality has occurred when paper is conveyed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A paper conveying apparatus comprising:
   a sound generator for generating a paper sound by contacting a paper;
   a first sound signal generator circuit for generating a first sound signal corresponding to the paper sound generated by the sound generator;
   a second sound signal generator circuit for generating a second sound signal corresponding to a sound generated by the paper during conveyance of the paper; and
   a processing unit for determining whether a jam has occurred based on a signal of a specific frequency band in the second sound signal;
   wherein the processing unit changes the specific frequency band based on the first sound signal.

2. The paper conveying apparatus according to claim 1, further comprising an ultrasonic detector circuit for detecting an ultrasonic wave which passes through paper and outputting an ultrasonic signal; and
   a multifeed detector circuit for determining whether a multifeed of papers has occurred based on the ultrasonic signal,
   wherein the multifeed detector circuit changes the detection method of multifeed based on the first sound signal.

3. An abnormality detection method comprising:
   generating a paper sound by a sound generator contacting a paper;
   acquiring a first sound signal from a first sound signal generator for generating the first sound signal corresponding to the paper sound generated by the sound generator;
   acquiring a second sound signal from a second sound signal generator for generating the second sound signal corresponding to a sound generated by the paper during conveyance of the paper; and
   determining, by a computer, whether a jam has occurred based on a signal of a specific frequency band in the second sound signal, wherein the computer changes the specific frequency band based on the first sound signal, in the determining step.

4. A computer-readable, non-transitory medium storing a computer program, wherein the computer program causes a computer to execute a process, the process comprising:
   receiving a paper sound generated by a sound generator contacting a paper;

acquiring a first sound signal from a first sound signal generator for generating the first sound signal corresponding to the paper sound generated by the sound generator;

acquiring a second sound signal from a second sound signal generator for generating the second sound signal corresponding to a sound generated by the paper during conveyance of the paper; and determining whether a jam has occurred based on a signal of a specific frequency band in the second sound signal, wherein the computer changes the specific frequency band based on the first sound signal, in the determining step.

* * * * *